United States Patent
Shabtay et al.

(10) Patent No.: US 11,314,146 B2
(45) Date of Patent: *Apr. 26, 2022

(54) DUAL-APERTURE ZOOM DIGITAL CAMERA WITH AUTOMATIC ADJUSTABLE TELE FIELD OF VIEW

(71) Applicant: Corephotonics Ltd., Tel-Aviv (IL)

(72) Inventors: Gal Shabtay, Tel-Aviv (IL); Ephraim Goldenberg, Ashdod (IL); Eran Kali, Jerusalem (IL); Noy Cohen, Tel Aviv (IL); Gil Avraham, Givat Ada (IL); Ruthy Katz, Tel-Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/145,303

(22) Filed: Jan. 9, 2021

(65) Prior Publication Data

US 2021/0132465 A1 May 6, 2021

Related U.S. Application Data

(63) Continuation of application No. 16/699,577, filed on Nov. 30, 2019, now Pat. No. 10,935,870, which is a
(Continued)

(51) Int. Cl.
*G03B 3/06* (2021.01)
*G03B 17/17* (2021.01)
(Continued)

(52) U.S. Cl.
CPC ............ *G03B 3/06* (2013.01); *G02B 26/105* (2013.01); *G03B 17/17* (2013.01); *H04N 3/08* (2013.01);
(Continued)

(58) Field of Classification Search
CPC .... G03B 3/06; G03B 17/17; G03B 2217/002; H04N 3/08; H04N 5/2259; H04N 5/23293;
(Continued)

(56) References Cited

U.S. PATENT DOCUMENTS 4,199,785 A 4/1980 McCullough et al.
5,005,083 A 4/1991 Grage et al.
(Continued)

FOREIGN PATENT DOCUMENTS

CN 101276415 A 10/2008
CN 201514511 U 6/2010
(Continued)

OTHER PUBLICATIONS

Statistical Modeling and Performance Characterization of a Real-Time Dual Camera Surveillance System, Greienhagen et al., Publisher: IEEE, 2000, 8 pages.
(Continued)

*Primary Examiner* — Jennifer D Bennett
(74) *Attorney, Agent, or Firm* — Nathan & Associates; Menachem Nathan

(57) ABSTRACT

Digital camera comprising an upright Wide camera configured to provide a Wide image with a Wide image resolution and a folded Tele camera configured to provide a Tele image with a Tele image resolution higher than the Wide image resolution, the Wide and Tele cameras having respective Wide and Tele fields of view $FOV_W$ and $FOV_T$ and respective Wide and Tele image sensors, the digital camera further comprising a rotating OPFE operative to provide a folded optical path between an object or scene and the Tele image sensor, wherein rotation of the OPFE moves $FOV_T$ relative to $FOV_W$. In some embodiments, a rectangular $FOV_T$ is orthogonal to a rectangular $FOV_W$. When included in a host
(Continued)

device having a user interface that displays $FOV_T$ within $FOV_W$, the user interface may be used to position $FOV_T$ relative to $FOV_W$, scan $FOV_T$ across $FOV_W$ and acquire, store and display separate Wide and Tele images, composite Wide plus Tele images and stitched Tele images. The positioning of $FOV_T$ within $FOV_W$ can be done automatically (autonomously) by continuously tracking an object of interest.

10 Claims, 12 Drawing Sheets

Related U.S. Application Data continuation of application No. 15/525,059, filed as application No. PCT/IB2016/057366 on Dec. 5, 2016, now Pat. No. 10,578,948.

(60) Provisional application No. 62/361,150, filed on Jul. 12, 2016, provisional application No. 62/272,367, filed on Dec. 29, 2015.

(51) Int. Cl.
  *H04N 3/08* (2006.01)
  *G02B 26/10* (2006.01)
  *H04N 5/225* (2006.01)
  *H04N 5/232* (2006.01)
  *H04N 5/247* (2006.01)
  *G02B 13/06* (2006.01)

(52) U.S. Cl.
  CPC ......... *H04N 5/2254* (2013.01); *H04N 5/2258* (2013.01); *H04N 5/2259* (2013.01); *H04N 5/23232* (2013.01); *H04N 5/23293* (2013.01); *H04N 5/232933* (2018.08); *H04N 5/247* (2013.01); *G02B 13/06* (2013.01); *G03B 2217/002* (2013.01)

(58) Field of Classification Search
  CPC ............. H04N 5/247; H04N 5/232933; H04N 5/23232; H04N 5/2258; H04N 5/2254; G02B 26/105; G02B 13/06
  See application file for complete search history.

(56) References Cited

U.S. PATENT DOCUMENTS

| | | | |
|---|---|---|---|
| 5,032,917 A | 7/1991 | Aschwanden | |
| 5,041,852 A | 8/1991 | Misawa et al. | |
| 5,051,830 A | 9/1991 | von Hoessle | |
| 5,099,263 A | 3/1992 | Matsumoto et al. | |
| 5,248,971 A | 9/1993 | Mandl | |
| 5,287,093 A | 2/1994 | Amano et al. | |
| 5,394,520 A | 2/1995 | Hall | |
| 5,436,660 A | 7/1995 | Sakamoto | |
| 5,444,478 A | 8/1995 | Lelong et al. | |
| 5,459,520 A | 10/1995 | Sasaki | |
| 5,657,402 A | 8/1997 | Bender et al. | |
| 5,682,198 A | 10/1997 | Katayama et al. | |
| 5,768,443 A | 6/1998 | Michael et al. | |
| 5,926,190 A | 7/1999 | Turkowski et al. | |
| 5,940,641 A | 8/1999 | McIntyre et al. | |
| 5,982,951 A | 11/1999 | Katayama et al. | |
| 6,101,334 A | 8/2000 | Fantone | |
| 6,128,416 A | 10/2000 | Oura | |
| 6,148,120 A | 11/2000 | Sussman | |
| 6,208,765 B1 | 3/2001 | Bergen | |
| 6,268,611 B1 | 7/2001 | Pettersson et al. | |
| 6,549,215 B2 | 4/2003 | Jouppi | |
| 6,611,289 B1 | 8/2003 | Yu et al. | |
| 6,643,416 B1 | 11/2003 | Daniels et al. | |
| 6,650,368 B1 | 11/2003 | Doron | |
| 6,680,748 B1 | 1/2004 | Monti | |
| 6,714,665 B1 | 3/2004 | Hanna et al. | |
| 6,724,421 B1 | 4/2004 | Glatt | |
| 6,738,073 B2 | 5/2004 | Park et al. | |
| 6,741,250 B1 | 5/2004 | Furlan et al. | |
| 6,750,903 B1 | 6/2004 | Miyatake et al. | |
| 6,778,207 B1 | 8/2004 | Lee et al. | |
| 7,002,583 B2 | 2/2006 | Rabb, III | |
| 7,015,954 B1 | 3/2006 | Foote et al. | |
| 7,038,716 B2 | 5/2006 | Klein et al. | |
| 7,199,348 B2 | 4/2007 | Olsen et al. | |
| 7,206,136 B2 | 4/2007 | Labaziewicz et al. | |
| 7,248,294 B2 | 7/2007 | Slatter | |
| 7,256,944 B2 | 8/2007 | Labaziewicz et al. | |
| 7,305,180 B2 | 12/2007 | Labaziewicz et al. | |
| 7,339,621 B2 | 3/2008 | Fortier | |
| 7,346,217 B1 | 3/2008 | Gold, Jr. | |
| 7,365,793 B2 | 4/2008 | Cheatle et al. | |
| 7,411,610 B2 | 8/2008 | Doyle | |
| 7,424,218 B2 | 9/2008 | Baudisch et al. | |
| 7,509,041 B2 | 3/2009 | Hosono | |
| 7,533,819 B2 | 5/2009 | Barkan et al. | |
| 7,619,683 B2 | 11/2009 | Davis | |
| 7,738,016 B2 | 6/2010 | Toyofuku | |
| 7,773,121 B1 | 8/2010 | Huntsberger et al. | |
| 7,809,256 B2 | 10/2010 | Kuroda et al. | |
| 7,880,776 B2 | 2/2011 | LeGall et al. | |
| 7,918,398 B2 | 4/2011 | Li et al. | |
| 7,964,835 B2 | 6/2011 | Olsen et al. | |
| 7,978,239 B2 | 7/2011 | Deever et al. | |
| 8,115,825 B2 | 2/2012 | Culbert et al. | |
| 8,149,327 B2 | 4/2012 | Lin et al. | |
| 8,154,610 B2 | 4/2012 | Jo et al. | |
| 8,238,695 B1 | 8/2012 | Davey et al. | |
| 8,274,552 B2 | 9/2012 | Dahi et al. | |
| 8,390,729 B2 | 3/2013 | Long et al. | |
| 8,391,697 B2 | 3/2013 | Cho et al. | |
| 8,400,555 B1 | 3/2013 | Georgiev et al. | |
| 8,439,265 B2 | 5/2013 | Ferren et al. | |
| 8,446,484 B2 | 5/2013 | Muukki et al. | |
| 8,483,452 B2 | 7/2013 | Ueda et al. | |
| 8,514,491 B2 | 8/2013 | Duparre | |
| 8,547,389 B2 | 10/2013 | Hoppe et al. | |
| 8,553,106 B2 | 10/2013 | Scarff | |
| 8,587,691 B2 | 11/2013 | Takane | |
| 8,619,148 B1 | 12/2013 | Watts et al. | |
| 8,803,990 B2 | 8/2014 | Smith | |
| 8,896,655 B2 | 11/2014 | Mauchly et al. | |
| 8,976,255 B2 | 3/2015 | Matsuoto et al. | |
| 9,019,387 B2 | 4/2015 | Nakano | |
| 9,025,073 B2 | 5/2015 | Attar et al. | |
| 9,025,077 B2 | 5/2015 | Attar et al. | |
| 9,041,835 B2 | 5/2015 | Honda | |
| 9,137,447 B2 | 9/2015 | Shibuno | |
| 9,185,291 B1 | 11/2015 | Shabtay et al. | |
| 9,215,377 B2 | 12/2015 | Sokeila et al. | |
| 9,215,385 B2 | 12/2015 | Luo | |
| 9,270,875 B2 | 2/2016 | Brisedoux et al. | |
| 9,286,680 B1 | 3/2016 | Jiang et al. | |
| 9,344,626 B2 | 5/2016 | Silverstein et al. | |
| 9,360,671 B1 | 6/2016 | Zhou | |
| 9,369,621 B2 | 6/2016 | Malone et al. | |
| 9,413,930 B2 | 8/2016 | Geerds | |
| 9,413,984 B2 | 8/2016 | Attar et al. | |
| 9,420,180 B2 | 8/2016 | Jin | |
| 9,438,792 B2 | 9/2016 | Nakada et al. | |
| 9,485,432 B1 | 11/2016 | Medasani et al. | |
| 9,578,257 B2 | 2/2017 | Attar et al. | |
| 9,618,748 B2 | 4/2017 | Munger et al. | |
| 9,681,057 B2 | 6/2017 | Attar et al. | |
| 9,723,220 B2 | 8/2017 | Sugie | |
| 9,736,365 B2 | 8/2017 | Laroia | |
| 9,736,391 B2 | 8/2017 | Du et al. | |
| 9,768,310 B2 | 9/2017 | Ahn et al. | |
| 9,800,798 B2 | 10/2017 | Ravirala et al. | |
| 9,851,803 B2 | 12/2017 | Fisher et al. | |
| 9,894,287 B2 | 2/2018 | Qian et al. | |
| 9,900,522 B2 | 2/2018 | Lu | |

(56) References Cited

U.S. PATENT DOCUMENTS

| | | |
|---|---|---|
| 9,927,600 B2 | 3/2018 | Goldenberg et al. |
| 10,578,948 B2 * | 3/2020 | Shabtay ............... G02B 26/105 |
| 10,935,870 B2 * | 3/2021 | Shabtay ................ G03B 17/17 |
| 2002/0005902 A1 | 1/2002 | Yuen |
| 2002/0030163 A1 | 3/2002 | Zhang |
| 2002/0063711 A1 | 5/2002 | Park et al. |
| 2002/0075258 A1 | 6/2002 | Park et al. |
| 2002/0122113 A1 | 9/2002 | Foote |
| 2002/0167741 A1 | 11/2002 | Koiwai et al. |
| 2002/0180759 A1 * | 12/2002 | Park ..................... H04N 9/8047 345/629 |
| 2003/0030729 A1 | 2/2003 | Prentice et al. |
| 2003/0093805 A1 | 5/2003 | Gin |
| 2003/0160886 A1 | 8/2003 | Misawa et al. |
| 2003/0202113 A1 | 10/2003 | Yoshikawa |
| 2004/0008773 A1 | 1/2004 | Itokawa |
| 2004/0012683 A1 | 1/2004 | Yamasaki et al. |
| 2004/0017386 A1 | 1/2004 | Liu et al. |
| 2004/0027367 A1 | 2/2004 | Pilu |
| 2004/0061788 A1 | 4/2004 | Bateman |
| 2004/0141065 A1 | 7/2004 | Hara et al. |
| 2004/0141086 A1 | 7/2004 | Mihara |
| 2004/0240052 A1 | 12/2004 | Minefuji et al. |
| 2005/0013509 A1 | 1/2005 | Samadani |
| 2005/0046740 A1 | 3/2005 | Davis |
| 2005/0157184 A1 | 7/2005 | Nakanishi et al. |
| 2005/0168834 A1 | 8/2005 | Matsumoto et al. |
| 2005/0185049 A1 | 8/2005 | Iwai et al. |
| 2005/0200718 A1 | 9/2005 | Lee |
| 2006/0054782 A1 | 3/2006 | Olsen et al. |
| 2006/0056056 A1 | 3/2006 | Ahiska et al. |
| 2006/0067672 A1 | 3/2006 | Washisu et al. |
| 2006/0102907 A1 | 5/2006 | Lee et al. |
| 2006/0125937 A1 | 6/2006 | LeGall et al. |
| 2006/0170793 A1 | 8/2006 | Pasquarette et al. |
| 2006/0175549 A1 | 8/2006 | Miller et al. |
| 2006/0187310 A1 | 8/2006 | Janson et al. |
| 2006/0187322 A1 | 8/2006 | Janson et al. |
| 2006/0187338 A1 | 8/2006 | May et al. |
| 2006/0227236 A1 | 10/2006 | Pak |
| 2007/0024737 A1 | 2/2007 | Nakamura et al. |
| 2007/0126911 A1 | 6/2007 | Nanjo |
| 2007/0177025 A1 | 8/2007 | Kopet et al. |
| 2007/0188653 A1 | 8/2007 | Pollock et al. |
| 2007/0189386 A1 | 8/2007 | Imagawa et al. |
| 2007/0257184 A1 | 11/2007 | Olsen et al. |
| 2007/0285550 A1 | 12/2007 | Son |
| 2008/0017557 A1 | 1/2008 | Witdouck |
| 2008/0024614 A1 | 1/2008 | Li et al. |
| 2008/0025634 A1 | 1/2008 | Border et al. |
| 2008/0030592 A1 | 2/2008 | Border et al. |
| 2008/0030611 A1 | 2/2008 | Jenkins |
| 2008/0084484 A1 | 4/2008 | Ochi et al. |
| 2008/0106629 A1 | 5/2008 | Kurtz et al. |
| 2008/0117316 A1 | 5/2008 | Orimoto |
| 2008/0129831 A1 | 6/2008 | Cho et al. |
| 2008/0218611 A1 | 9/2008 | Parulski et al. |
| 2008/0218612 A1 | 9/2008 | Border et al. |
| 2008/0218613 A1 | 9/2008 | Janson et al. |
| 2008/0219654 A1 | 9/2008 | Border et al. |
| 2009/0086074 A1 | 4/2009 | Li et al. |
| 2009/0109556 A1 | 4/2009 | Shimizu et al. |
| 2009/0122195 A1 | 5/2009 | Van Baar et al. |
| 2009/0122406 A1 | 5/2009 | Rouvinen et al. |
| 2009/0128644 A1 | 5/2009 | Camp et al. |
| 2009/0219547 A1 | 9/2009 | Kauhanen et al. |
| 2009/0252484 A1 | 10/2009 | Hasuda et al. |
| 2009/0295949 A1 | 12/2009 | Ojala |
| 2009/0324135 A1 | 12/2009 | Kondo et al. |
| 2010/0013906 A1 | 1/2010 | Border et al. |
| 2010/0020221 A1 | 1/2010 | Tupman et al. |
| 2010/0060746 A9 | 3/2010 | Olsen et al. |
| 2010/0097444 A1 | 4/2010 | Lablans |
| 2010/0103194 A1 | 4/2010 | Chen et al. |
| 2010/0165131 A1 | 7/2010 | Makimoto et al. |
| 2010/0196001 A1 | 8/2010 | Ryynänen et al. |
| 2010/0238327 A1 | 9/2010 | Griffith et al. |
| 2010/0259836 A1 | 10/2010 | Kang et al. |
| 2010/0283842 A1 | 11/2010 | Guissin et al. |
| 2010/0321494 A1 | 12/2010 | Peterson et al. |
| 2011/0058320 A1 | 3/2011 | Kim et al. |
| 2011/0063417 A1 | 3/2011 | Peters et al. |
| 2011/0063446 A1 * | 3/2011 | McMordie ............. G06K 9/209 348/159 |
| 2011/0064327 A1 | 3/2011 | Dagher et al. |
| 2011/0080487 A1 | 4/2011 | Venkataraman et al. |
| 2011/0128288 A1 | 6/2011 | Petrou et al. |
| 2011/0164172 A1 | 7/2011 | Shintani et al. |
| 2011/0229054 A1 | 9/2011 | Weston et al. |
| 2011/0234798 A1 | 9/2011 | Chou |
| 2011/0234853 A1 | 9/2011 | Hayashi et al. |
| 2011/0234881 A1 | 9/2011 | Wakabayashi et al. |
| 2011/0242286 A1 | 10/2011 | Pace et al. |
| 2011/0242355 A1 | 10/2011 | Goma et al. |
| 2011/0242369 A1 * | 10/2011 | Misawa ................ H04N 5/232 348/240.2 |
| 2011/0298966 A1 | 12/2011 | Kirschstein et al. |
| 2012/0026366 A1 | 2/2012 | Golan et al. |
| 2012/0044372 A1 | 2/2012 | Cote et al. |
| 2012/0062780 A1 | 3/2012 | Morihisa |
| 2012/0069235 A1 | 3/2012 | Imai |
| 2012/0075489 A1 | 3/2012 | Nishihara |
| 2012/0105579 A1 | 5/2012 | Jeon et al. |
| 2012/0124525 A1 | 5/2012 | Kang |
| 2012/0154547 A1 | 6/2012 | Aizawa |
| 2012/0154614 A1 | 6/2012 | Moriya et al. |
| 2012/0196648 A1 | 8/2012 | Havens et al. |
| 2012/0229663 A1 | 9/2012 | Nelson et al. |
| 2012/0249815 A1 | 10/2012 | Bohn et al. |
| 2012/0287315 A1 | 11/2012 | Huang et al. |
| 2012/0320467 A1 | 12/2012 | Baik et al. |
| 2013/0002928 A1 | 1/2013 | Imai |
| 2013/0016427 A1 | 1/2013 | Sugawara |
| 2013/0063629 A1 | 3/2013 | Webster et al. |
| 2013/0076922 A1 | 3/2013 | Shihoh et al. |
| 2013/0093842 A1 | 4/2013 | Yahata |
| 2013/0094126 A1 | 4/2013 | Rappoport et al. |
| 2013/0113894 A1 | 5/2013 | Mirlay |
| 2013/0135445 A1 | 5/2013 | Dahi et al. |
| 2013/0155176 A1 | 6/2013 | Paripally et al. |
| 2013/0182150 A1 | 7/2013 | Asakura |
| 2013/0201360 A1 | 8/2013 | Song |
| 2013/0202273 A1 | 8/2013 | Ouedraogo et al. |
| 2013/0235224 A1 | 9/2013 | Park et al. |
| 2013/0250150 A1 | 9/2013 | Malone et al. |
| 2013/0258044 A1 | 10/2013 | Betts-LaCroix |
| 2013/0270419 A1 | 10/2013 | Singh et al. |
| 2013/0278785 A1 | 10/2013 | Nomura et al. |
| 2013/0321668 A1 | 12/2013 | Kamath |
| 2014/0009631 A1 | 1/2014 | Topliss |
| 2014/0049615 A1 | 2/2014 | Uwagawa |
| 2014/0118584 A1 | 5/2014 | Lee et al. |
| 2014/0160311 A1 | 6/2014 | Hwang et al. |
| 2014/0192238 A1 | 7/2014 | Attar et al. |
| 2014/0192253 A1 | 7/2014 | Laroia |
| 2014/0218587 A1 | 8/2014 | Shah |
| 2014/0313316 A1 | 10/2014 | Olsson et al. |
| 2014/0362242 A1 | 12/2014 | Takizawa |
| 2015/0002683 A1 | 1/2015 | Hu et al. |
| 2015/0042870 A1 | 2/2015 | Chan et al. |
| 2015/0070781 A1 | 3/2015 | Cheng et al. |
| 2015/0092066 A1 | 4/2015 | Geiss et al. |
| 2015/0103147 A1 | 4/2015 | Ho et al. |
| 2015/0138381 A1 | 5/2015 | Ahn |
| 2015/0154776 A1 | 6/2015 | Zhang et al. |
| 2015/0162048 A1 | 6/2015 | Hirata et al. |
| 2015/0195458 A1 | 7/2015 | Nakayama et al. |
| 2015/0215516 A1 | 7/2015 | Dolgin |
| 2015/0237280 A1 | 8/2015 | Choi et al. |
| 2015/0242994 A1 | 8/2015 | Shen |
| 2015/0244906 A1 | 8/2015 | Wu et al. |
| 2015/0253543 A1 | 9/2015 | Mercado |
| 2015/0253647 A1 | 9/2015 | Mercado |
| 2015/0261299 A1 | 9/2015 | Wajs |

(56) References Cited

U.S. PATENT DOCUMENTS

| | | | |
|---|---|---|---|
| 2015/0271471 A1 | 9/2015 | Hsieh et al. | |
| 2015/0281678 A1 | 10/2015 | Park et al. | |
| 2015/0286033 A1 | 10/2015 | Osborne | |
| 2015/0316744 A1 | 11/2015 | Chen | |
| 2015/0334309 A1 | 11/2015 | Peng et al. | |
| 2016/0044250 A1* | 2/2016 | Shabtay | G02B 13/04 348/240.3 |
| 2016/0070088 A1 | 3/2016 | Koguchi | |
| 2016/0154202 A1 | 6/2016 | Wippermann et al. | |
| 2016/0154204 A1 | 6/2016 | Lim et al. | |
| 2016/0212358 A1 | 7/2016 | Shikata | |
| 2016/0212418 A1 | 7/2016 | Demirdjian et al. | |
| 2016/0241751 A1 | 8/2016 | Park | |
| 2016/0291295 A1 | 10/2016 | Shabtay et al. | |
| 2016/0295112 A1 | 10/2016 | Georgiev et al. | |
| 2016/0301840 A1 | 10/2016 | Du et al. | |
| 2016/0353008 A1 | 12/2016 | Osborne | |
| 2016/0353012 A1 | 12/2016 | Kao et al. | |
| 2017/0019616 A1 | 1/2017 | Zhu et al. | |
| 2017/0034436 A1* | 2/2017 | Inoue | G01B 11/14 |
| 2017/0070731 A1 | 3/2017 | Darling et al. | |
| 2017/0187962 A1 | 6/2017 | Lee et al. | |
| 2017/0214846 A1 | 7/2017 | Du et al. | |
| 2017/0214866 A1 | 7/2017 | Zhu et al. | |
| 2017/0242225 A1 | 8/2017 | Fiske | |
| 2017/0289458 A1 | 10/2017 | Song et al. | |
| 2018/0013944 A1 | 1/2018 | Evans, V et al. | |
| 2018/0017844 A1 | 1/2018 | Yu et al. | |
| 2018/0024329 A1 | 1/2018 | Goldenberg et al. | |
| 2018/0059379 A1 | 3/2018 | Chou | |
| 2018/0120674 A1 | 5/2018 | Avivi et al. | |
| 2018/0150973 A1 | 5/2018 | Tang et al. | |
| 2018/0176426 A1 | 6/2018 | Wei et al. | |
| 2018/0198897 A1 | 7/2018 | Tang et al. | |
| 2018/0241922 A1 | 8/2018 | Baldwin et al. | |
| 2018/0295292 A1 | 10/2018 | Lee et al. | |
| 2018/0300901 A1 | 10/2018 | Wakai et al. | |
| 2019/0121103 A1 | 4/2019 | Bachar et al. | |
| 2021/0132466 A1* | 5/2021 | Shabtay | H04N 5/23232 |

FOREIGN PATENT DOCUMENTS

| | | |
|---|---|---|
| CN | 102739949 A | 10/2012 |
| CN | 103024272 A | 4/2013 |
| CN | 103841404 A | 6/2014 |
| EP | 1536633 A1 | 6/2005 |
| EP | 1780567 A1 | 5/2007 |
| EP | 2523450 A1 | 11/2012 |
| JP | S59191146 A | 10/1984 |
| JP | 04211230 A | 8/1992 |
| JP | H07318864 A | 12/1995 |
| JP | 08271976 A | 10/1996 |
| JP | 2002010276 A | 1/2002 |
| JP | 2003298920 A | 10/2003 |
| JP | 2004133054 A | 4/2004 |
| JP | 2004245982 A | 9/2004 |
| JP | 2005099265 A | 4/2005 |
| JP | 2006238325 A | 9/2006 |
| JP | 2007228006 A | 9/2007 |
| JP | 2007306282 A | 11/2007 |
| JP | 2008076485 A | 4/2008 |
| JP | 2010204341 A | 9/2010 |
| JP | 2011085666 A | 4/2011 |
| JP | 2013106289 A | 5/2013 |
| KR | 20070005946 A | 1/2007 |
| KR | 20090058229 A | 6/2009 |
| KR | 20100008936 A | 1/2010 |
| KR | 20140014787 A | 2/2014 |
| KR | 101477178 B1 | 12/2014 |
| KR | 20140144126 A | 12/2014 |
| KR | 20150118012 A | 10/2015 |
| WO | 2000027131 A2 | 5/2000 |
| WO | 2004084542 A1 | 9/2004 |
| WO | 2006008805 A1 | 1/2006 |
| WO | 2010122841 A1 | 10/2010 |
| WO | 2014072818 A2 | 5/2014 |
| WO | 2017025822 A1 | 2/2017 |
| WO | 2017037688 A1 | 3/2017 |
| WO | 2018130898 A1 | 7/2018 |

OTHER PUBLICATIONS

A 3MPixel Multi-Aperture Image Sensor with 0.7μm Pixels in 0.11μm CMOS, Fife et al., Stanford University, 2008, 3 pages.

Dual camera intelligent sensor for high definition 360 degrees surveillance, Scotti et al., Publisher: IET, May 9, 2000, 8 pages.

Dual-sensor foveated imaging system, Hua et al., Publisher: Optical Society of America, Jan. 14, 2008, 11 pages.

Defocus Video Matting, McGuire et al., Publisher: ACM SIGGRAPH, Jul. 31, 2005, 11 pages.

Compact multi-aperture imaging with high angular resolution, Santacana et al., Publisher: Optical Society of America, 2015, 10 pages.

Multi-Aperture Photography, Green et al., Publisher: Mitsubishi Electric Research Laboratories, Inc., Jul. 2007, 10 pages.

Multispectral Bilateral Video Fusion, Bennett et al., Publisher: IEEE, May 2007, 10 pages.

Super-resolution imaging using a camera array, Santacana et al., Publisher: Optical Society of America, 2014, 6 pages.

Optical Splitting Trees for High-Precision Monocular Imaging, McGuire et al., Publisher: IEEE, 2007, 11 pages.

High Performance Imaging Using Large Camera Arrays, Wilburn et al., Publisher: Association for Computing Machinery, Inc., 2005, 12 pages.

Real-time Edge-Aware Image Processing with the Bilateral Grid, Chen et al., Publisher: ACM SIGGRAPH, 2007, 9 pages.

Superimposed multi-resolution imaging, Carles et al., Publisher: Optical Society of America, 2017, 13 pages.

Viewfinder Alignment, Adams et al., Publisher: EUROGRAPHICS, 2008, 10 pages.

Dual-Camera System for Multi-Level Activity Recognition, Bodor et al., Publisher: IEEE, Oct. 2014, 6 pages.

Engineered to the task: Why camera-phone cameras are different, Giles Humpston, Publisher: Solid State Technology, Jun. 2009, 3 pages.

* cited by examiner

DUAL-APERTURE ZOOM DIGITAL CAMERA WITH AUTOMATIC ADJUSTABLE TELE FIELD OF VIEW

CROSS REFERENCE TO RELATED APPLICATIONS

This application is a continuation of U.S. patent application Ser. No. 16/699,577 filed Nov. 30, 2019 (now allowed), which was a continuation of U.S. patent application Ser. No. 15/525,059 filed May 6, 2017 (now issued as U.S. patent Ser. No. 10/578,948), which was a 371 application from international patent application PCT/IB2016/057366 filed Dec. 5, 2016 and claims priority from U.S. Provisional Patent Applications No. 62/272,367 filed on Dec. 29, 2015 and 62/361,150 filed on Jul. 12, 2016, both of which are expressly incorporated herein by reference in their entirety.

FIELD

Embodiments disclosed herein relate in general to digital cameras and in particular to thin zoom digital cameras.

BACKGROUND

Host devices or "personal computing and/or communication devices" (such as smartphones) having two back cameras (also referred to as "dual-camera" or "dual-aperture camera") are known, see e.g. U.S. Pat. No. 9,185,291. The two back cameras have two image sensors (or simply "sensors") operated simultaneously to capture an image, and have lenses with different focal lengths. Even though each lens/sensor combination is aligned to look in the same direction, each will capture an image of the same scene but with two different fields of view (FOV).

Dual-aperture zoom cameras in which one camera has a "Wide" FOV ($FOV_W$) and the 30 other has a narrow or "Tele" FOV ($FOV_T$) are also known, see e.g. U.S. Pat. No. 9,185,291. The cameras are referred to respectively as Wide and Tele cameras that include respective Wide and Tele sensors. These sensors provide respectively separate Wide and Tele images. The Wide image captures $FOV_W$ and has lower spatial resolution than the Tele image that captures $FOV_T$. As used herein, "FOV" is defined by the tangent of the angle between a line crossing the lens and parallel to the lens optical axes and a line between the lens and any object that is captured on the respective image corner. The images may be merged (fused) together to form a composite image. In the composite image, the central portion is formed by combining the relatively higher spatial resolution image taken by the lens/sensor combination with the longer focal length, and the peripheral portion is formed by a peripheral portion of the relatively lower spatial resolution image taken by the lens/sensor combination with the shorter focal length. The user selects a desired amount of zoom and the composite image is used to interpolate values from the chosen amount of zoom to provide a respective zoom image. Hereinafter, the use of "resolution" in this description refers to image spatial resolution, which is indicative to the resolving power of a camera as determined by the lens focal length, its aperture diameter and the sensor pixel size.

Dual-aperture cameras in which one image (normally the Tele image) is obtained through a folded optical path are known, see e.g. co-invented and co-owned U.S. patent application Ser. No. 14/455,906, which teaches zoom digital cameras comprising an "upright" (with a direct optical axis to an object or scene) Wide camera and a "folded" Tele camera, see also FIG. 2B below. The folded camera has an optical axis substantially perpendicular (orthogonal) to an optical axis of the upright camera. The folded Tele camera may be auto-focused and optically stabilized by moving either its lens or by tilting an optical path folding (reflecting) element (e.g. a prism or mirror and referred to also as "OPFE") inserted in an optical path between its lens and a respective sensor. For simplicity, the optical path folding element is referred to hereinafter in this description generically as "prism", with the understanding that the term may refer to any other optical path folding (reflecting) element that can perform the function of folding an optical path as described herein.

For example, PCT patent application PCT/IB2016/056060 titled "Dual-aperture zoom digital camera user interface" discloses a user interface for operating a dual-aperture digital camera included in host device, the dual-aperture digital camera including a Wide camera and a Tele camera, the user interface comprising a screen configured to display at least one icon and an image of a scene acquired with at least one of the Tele and Wide cameras, a frame defining $FOV_T$ superposed on a Wide image defined by $FOV_W$, and means to switch the screen from displaying the Wide image to displaying the Tele image. The user interface further comprises means to switch the screen from displaying the Tele image to displaying the Wide image. The user interface may further comprise means to acquire the Tele image, means to store and display the acquired Tele image, means to acquire simultaneously the Wide image and the Tele image, means to store and display separately the Wide and Tele images, a focus indicator for the Tele image and a focus indicator for the Wide image.

Object recognition is known and describes the task of finding and identifying objects in an image or video sequence. Many approaches have been implemented for accomplishing this task in computer vision systems. Such approaches may rely on appearance based methods by using example images under varying conditions and large model-bases, and/or on feature based methods comprising of a search to find feasible matches between object features and image features, e.g., by using surface patches, corners and edges detection and matching. Recognized objects can be tracked in preview or video feeds using an algorithm for analyzing sequential frames and outputting the movement of targets between the frames.

The problem of motion-based object tracking can be divided into two parts:

(1) detecting moving objects in each frame. This can be done either by incorporating an object recognition algorithm for recognizing and tracking specific objects (e.g., human face) or, for example, by detecting any moving object in a scene. The latter may incorporate a background subtraction algorithm based on Gaussian mixture models with Morphological operations applied to the resulting foreground mask to eliminate noise. Blob analysis can later detect groups of connected pixels, which are likely to correspond to moving objects.

(2) associating the detections corresponding to the same object over time, e.g., using motion estimation filters such as the Kalman filter.

SUMMARY

In exemplary embodiments, there are provided digital cameras comprising an upright Wide camera configured to provide a Wide image with a Wide image resolution, the Wide camera comprising a Wide image sensor and a Wide lens with a Wide field of view ($FOV_W$); a folded Tele camera configured to provide a Tele image with a Tele image resolution higher than the Wide image resolution, the Tele camera comprising a Tele image sensor and a Tele lens with a Tele field of view ($FOV_T$); and a rotating OPFE (e.g. prism) operative to provide a folded optical path between an object or scene and the Tele sensor, wherein rotation of the prism moves $FOV_T$ relative to $FOV_W$.

In an embodiment, the Wide and Tele image sensors have a substantially rectangular shape defined by a respective height dimension and a respective width dimension and are in orthogonal planes and with their respective height dimensions orthogonal to each other such that $FOV_T$ is rotated at 90 degrees to $FOV_W$.

In an embodiment, the movement of $FOV_T$ relative to $FOV_W$ is performed in a scanning mode that provides a plurality of partially-overlapping or adjacent non-overlapping Tele FOVs within $FOV_W$.

In an embodiment, the prism rotation has a range of up to ±15 degrees around a zero prism position in which $FOV_T$ is centric to $FOV_W$.

In an embodiment, the digital camera may be included in a host device having a user interface for operating the digital camera, the user interface comprising a screen configured to display at least one icon and an image of the object or scene acquired with at least one of the Tele and Wide cameras and to display a frame defining $FOV_T$ within $FOV_W$. The host device may have a user interface for operating the digital camera, the user interface comprising a screen configured to display at least one icon and an image of the object or scene acquired with at least one of the Tele and Wide cameras and to display a frame defining $FOV_T$ within $FOV_W$. In an embodiment, the user interface may further comprise means for moving $FOV_T$ relative to $FOV_W$. In an embodiment, the user interface may further comprise means for scanning $FOV_T$ across $FOV_W$ In an embodiment, the user interface may further comprise means for switching the screen from displaying the Wide image to displaying the Tele image. In an embodiment, the user interface may further comprise means to acquire the Tele image. In an embodiment, the user interface may further comprise means to acquire simultaneously the Wide image and the Tele image.

In an embodiment, the user interface may further comprise means to automatically (autonomously) move the $FOV_T$ relative to $FOV_W$ to track object of interest. In such cases, the camera may also be referred to as an "autonomous" camera.

In an embodiment, the user interface may further comprise means to acquire video streams of the Wide and Tele camera simultaneously.

In an embodiment, Tele images representing are plurality of adjacent non-overlapping Tele FOVs are stitched together to form a stitched Tele image used in the fusion with the Wide image.

In an embodiment, at least one Tele image includes a plurality of consecutive Tele images stitched together to form a stitched Tele image used in a fusion procedure with the Wide image to provide a composite image.

In an embodiment, the Wide and Tele images or video streams can be fused (or combined or stitched) on the device or in a cloud environment (referred to simply as "cloud").

In an embodiment, the digital camera is further configured to form a composite video stream in which each frame is based on either a processed Wide image or a processed Tele image, the processed Wide and Tele images acquired during the autonomous $FOV_T$ tracking.

BRIEF DESCRIPTION OF THE DRAWINGS

Non-limiting examples of embodiments disclosed herein are described below with reference to figures attached hereto that are listed following this paragraph. Identical structures, elements or parts that appear in more than one figure are generally labeled with a same numeral in all the figures in which they appear. The drawings and descriptions are meant to illuminate and clarify embodiments disclosed herein, and should not be considered limiting in any way.

DETAILED DESCRIPTION

Figure 1A:
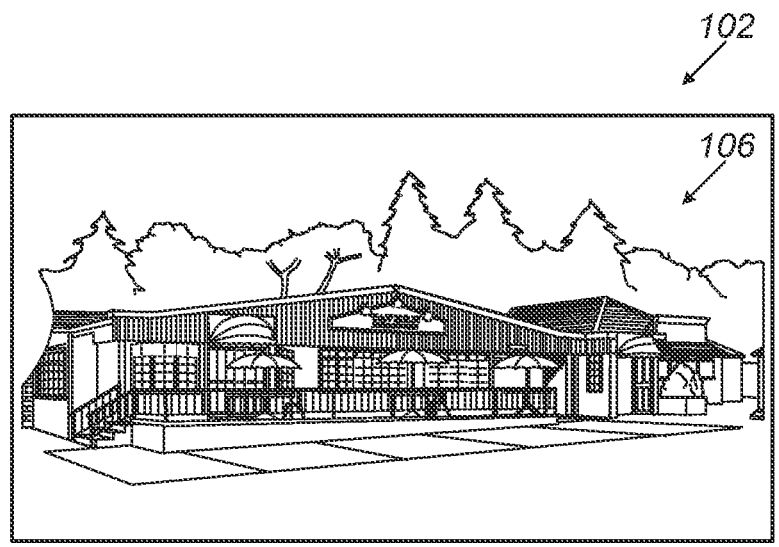
FIG. 1A shows schematically an image reflecting the Wide FOV of a scene.
Figure 1B:
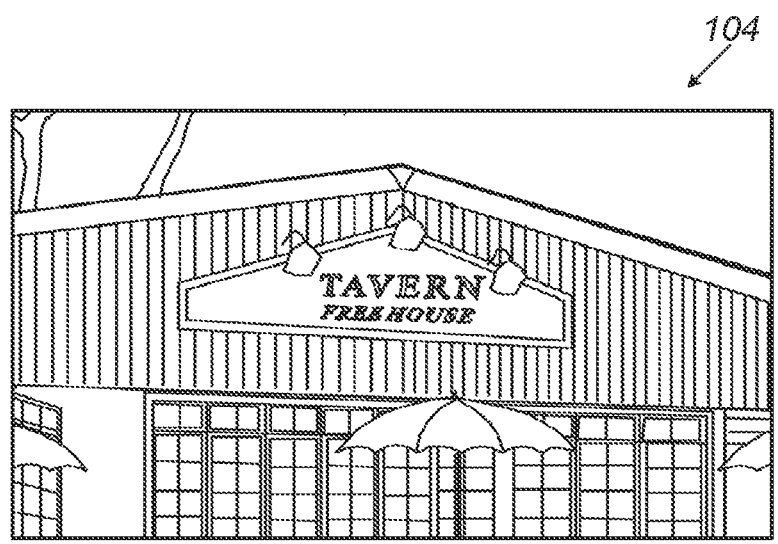
FIG. 1B shows schematically an image reflecting the Tele FOV of the scene in FIG. 1A.

FIG. 1A shows schematically an image (or frame of a video stream) 102 reflecting the Wide FOV of a scene 106. FIG. 1B shows schematically an image (or frame of a video stream) 104 reflecting the Tele FOV of scene 106. Only part of the scene of FIG. 1A is seen in FIG. 1B. The two images or video streams are obtained simultaneously with a dual-aperture camera having an upright Wide camera and a folded Tele camera of the type for example disclosed in U.S. patent application Ser. No. 14/455,906. The two cameras may, for example, be two back cameras included in a smartphone or in another personal communication device.

Figure 2A:
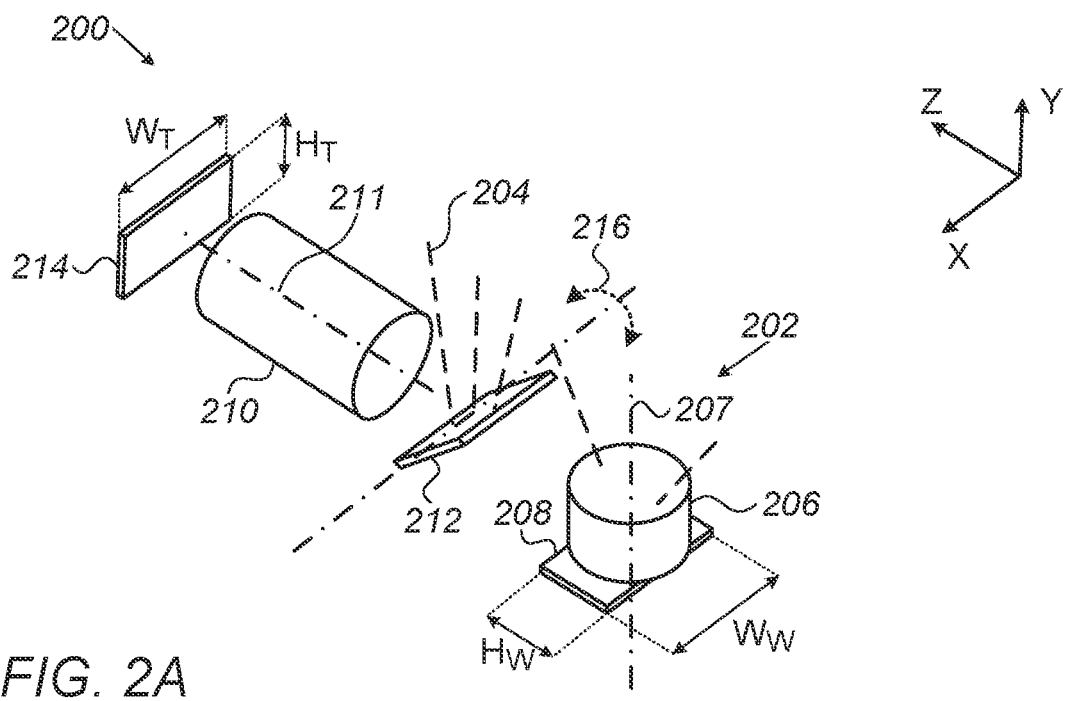
FIG. 2A shows schematically a dual-aperture camera comprising a first upright camera and a second folded camera, with a prism folding an optical path to the folded camera in a zero position.
Figure 3:
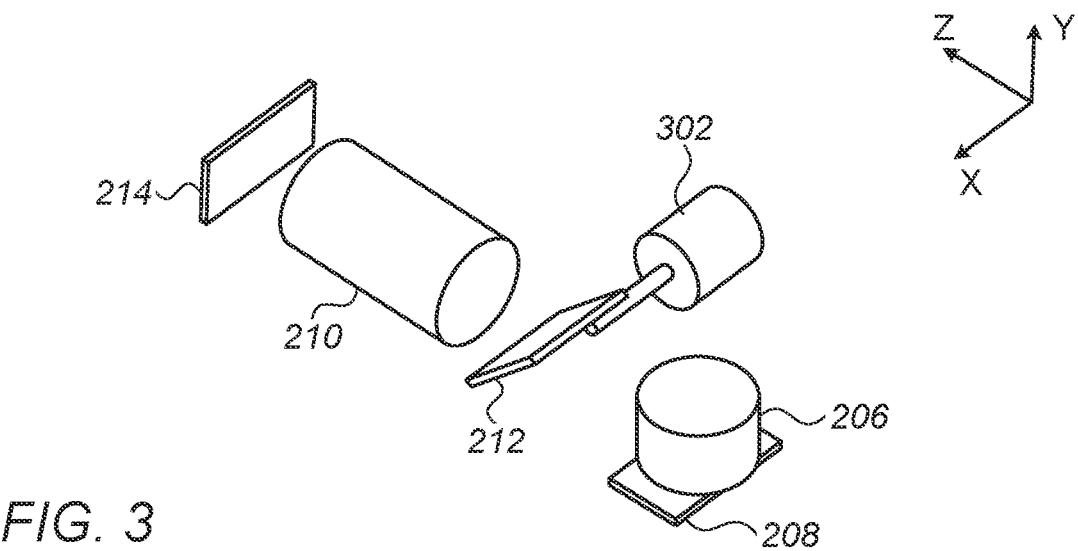
FIG. 3 shows schematically an arrangement enabling tilt of a prism in a folded optical path.

FIG. 2A shows schematically a dual-aperture camera 200 comprising a first upright camera 202 and a second folded camera 204. An XYZ coordinate system as shown is used in the description of this and all following "camera" drawings. For example, upright camera 202 is a Wide camera that includes a Wide lens assembly (or simply "lens") 206 with an optical axis 207, and a Wide sensor 208. For example, folded camera 204 is a Tele camera that includes a Tele lens 210 with an optical axis 211, and a Tele sensor 214. An OPIE (e.g. prism) 212 may be part of the folded Tele camera or may be a separate element that folds an optical path parallel to axis 207 into an optical path parallel to axis 211 into the Tele lens. The Wide and Tele sensors lie in respective orthogonal planes, respectively the XU plane and the XU plane. For example, the Wide and Tele sensors are substantially rectangular with respective height (H) and width (W) dimensions. Thus, Wide sensor 208 has a height $H_W$ and a width $W_W$ and Tele sensor 214 has a height $H_T$ and a width $W_T$. The H/W ratio in both sensors is typically (although not necessarily) 9/16 or 3/4. In the folded camera, positioning of sensor 214 with its height in the Y direction is advantageous in that it allows a smaller host device (e.g. a smartphone) thickness. In camera 200 in FIG. 2A (as well as cameras 200 in FIGS. 3, 4A and 5A), the width dimensions of sensors 208 and 214 are parallel to each other and to the X-axis.

The operation of a camera such as camera 200 is described in more detail in US patent application Ser. No. 14/455,906. In particular, the prism can perform a tilt (rotation) movement 216 around the X-axis as shown. The rotation motion may be caused by a stepping motor 302 shown schematically in FIG. 3. The prism rotation angle may range between −15 degrees and +15 degrees around a "zero" position (see below), corresponding to 30 degrees $FOV_T$ shift. Cameras 202 and 204 are used for example to take respectively the Wide and Tele images of FIGS. 1A and 1B.

Figure 2B:
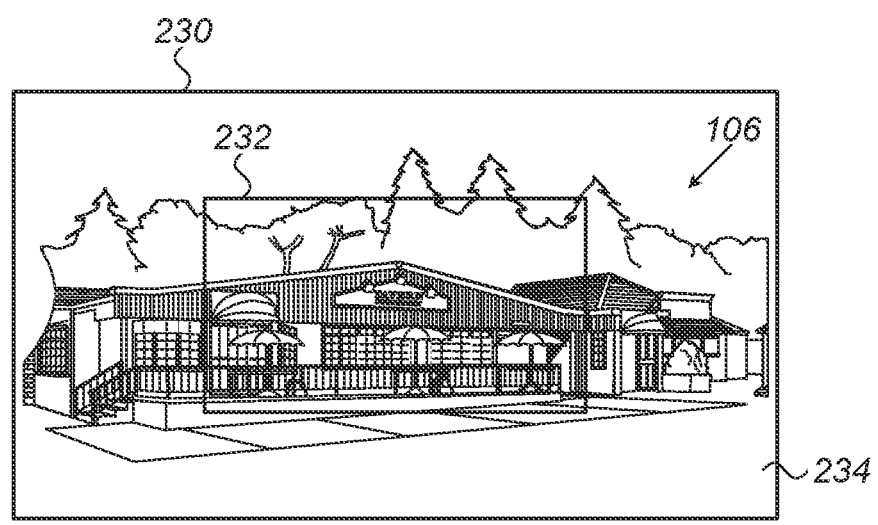
FIG. 2B shows a composite image obtained with a dual-aperture camera as in FIG. 2A, with the Tele FOV resulting from the zero position of the prism.

FIG. 2B shows an image 230 identical with Wide image 102 with a frame 232 that indicates the position of the Tele image FOV. The camera can have high resolution in this framed FOV either by fusing the Wide and Tele images or by capturing and saving the Tele image. For reference purposes, the position of the prism that causes the Tele FOV and resulting image to be centric to the Wide FOV and Wide image is called here for example and in a non-limiting way a "zero" position of the prism.

Figure 4A:
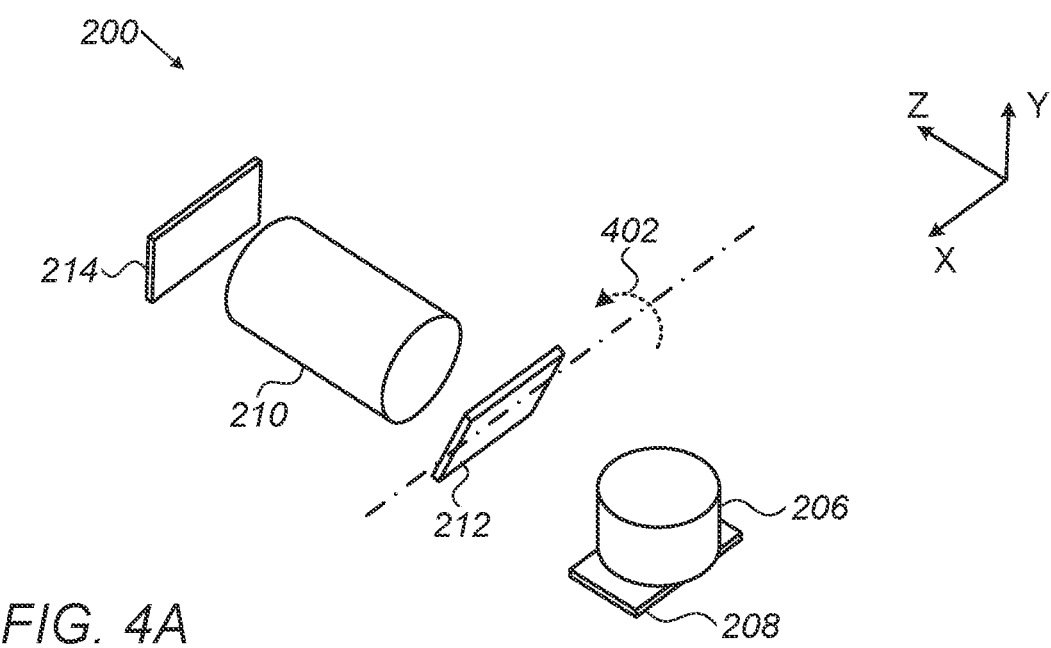
FIG. 4A shows schematically the dual-aperture camera of FIG. 2A with the prism rotated to a first position.
Figure 4B:
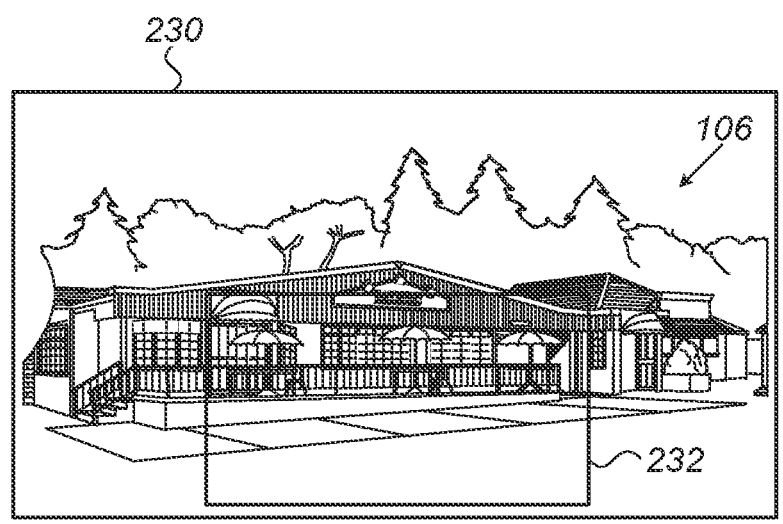
FIG. 4B shows a composite image obtained with a dual-aperture camera as in FIG. 4A, with the Tele FOV resulting from the first prism position.
Figure 5A:
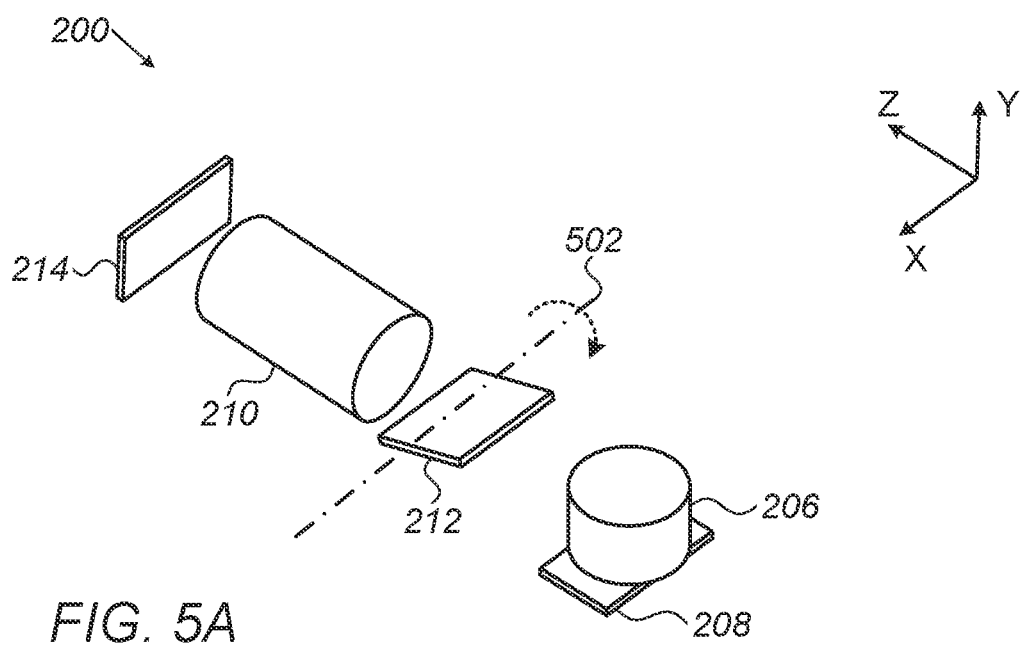
FIG. 5A shows schematically the dual-aperture camera of FIG. 2A with the prism rotated to a second position.
Figure 5B:
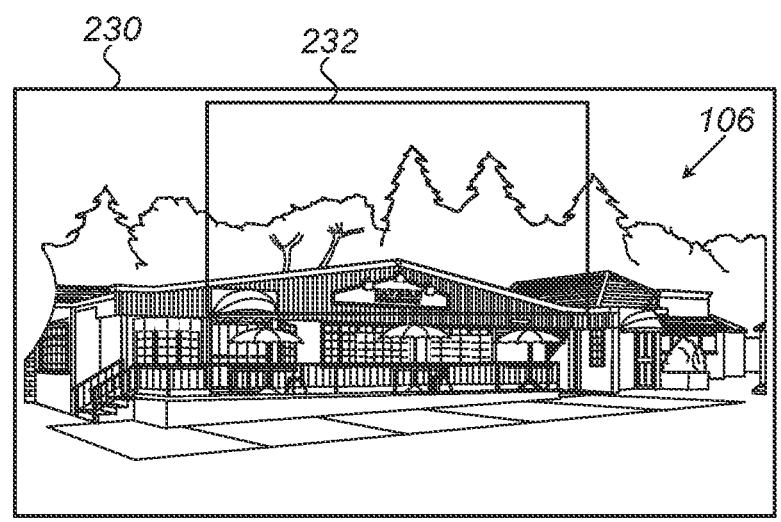
FIG. 5B shows a composite image obtained with a dual-aperture camera as in FIG. 5A, with the Tele FOV resulting from the second prism position.

The rotation of prism 212 around the X-axis moves the Tele FOV relative to the Wide FOV, causing other portions of scene 106 to become a "Tele image" with higher resolution. Thus, FIG. 4A shows prism 212 rotated counter-clockwise (as indicated by a curved arrow 402 when viewed in the −X direction) around the X-axis from its zero position to a new, first position. The counter-clockwise rotation causes the Tele FOV, indicated by frame 232, to move to a new, "down" position relative to the Wide FOV indicated by frame 230. FIG. 5A shows prism 212 rotated clockwise (as indicated by a curved arrow 502 when viewed in the −X direction) around the X-axis from its zero position to a new, second position. The clockwise rotation causes the Tele FOV, indicated by frame 232, to move to another new, "up" position relative to the Wide FOV indicated by frame 230. While FIGS. 4A, 4B, 5A and 5B show two discrete prism rotation movements and two discrete Tele FOV positions relative to the Wide FOV, there is clearly an entire range of practically continuous positions that the Tele FOV may occupy, depending on the degree and direction of prism rotation.

Figure 6A:
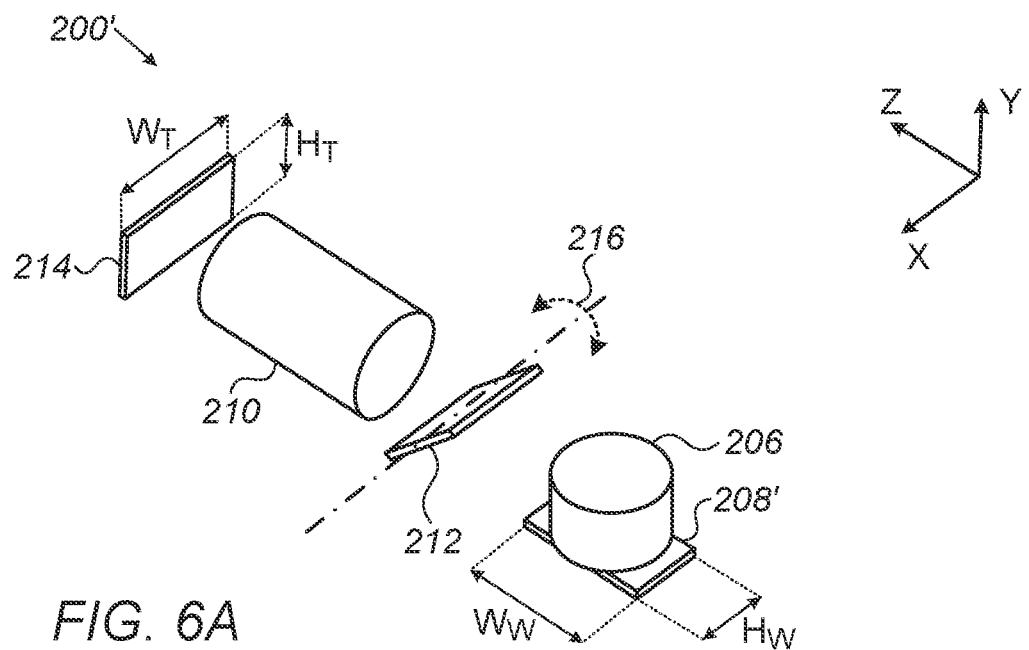
FIG. 6A shows schematically a dual-aperture camera comprising a first upright camera with a sensor rotated by 90 degrees relative to that in the camera of FIG. 2A and with a prism folding an optical path to a folded camera in a zero position.
Figure 6B:
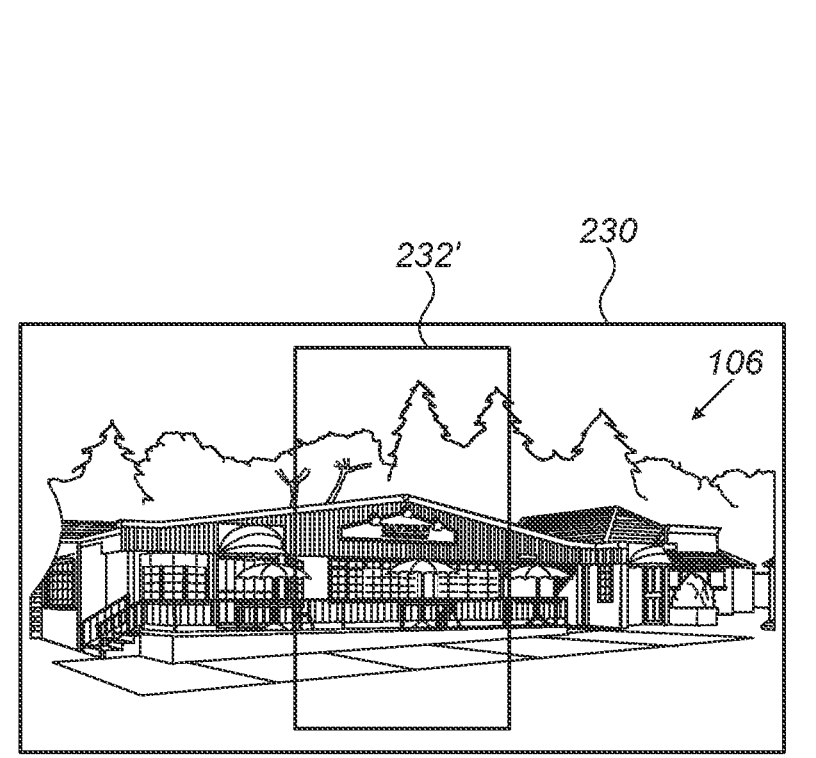
FIG. 6B shows a composite image obtained with a dual-aperture camera as in FIG. 6A, with the Tele FOV resulting from the zero position of the prism.
Figure 7A:
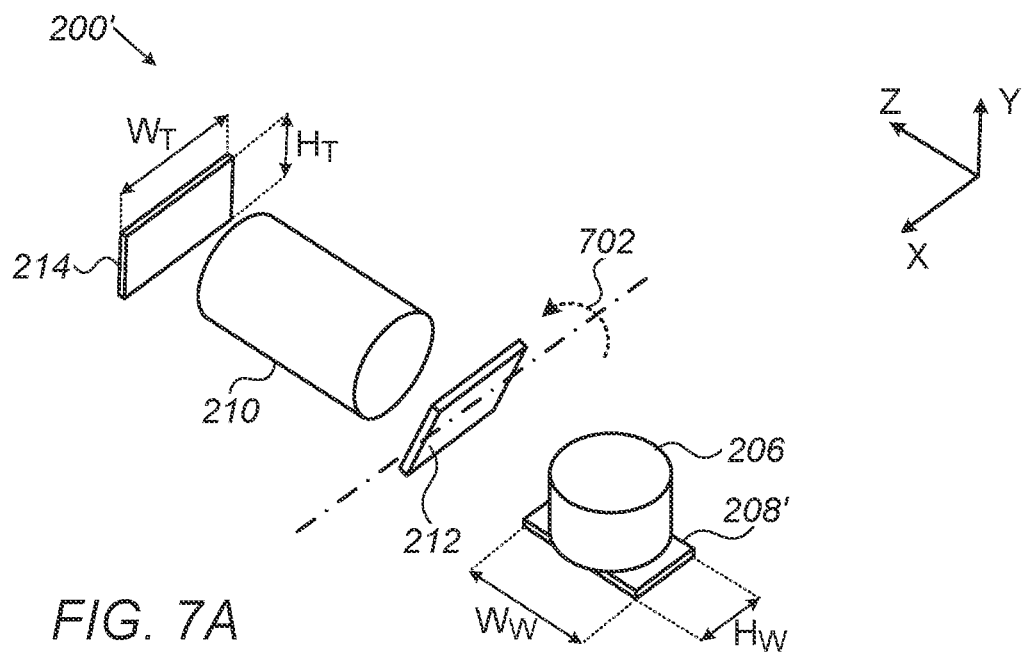
FIG. 7A shows schematically the dual-aperture camera of FIG. 6A with the prism rotated to a first position.
Figure 8A:
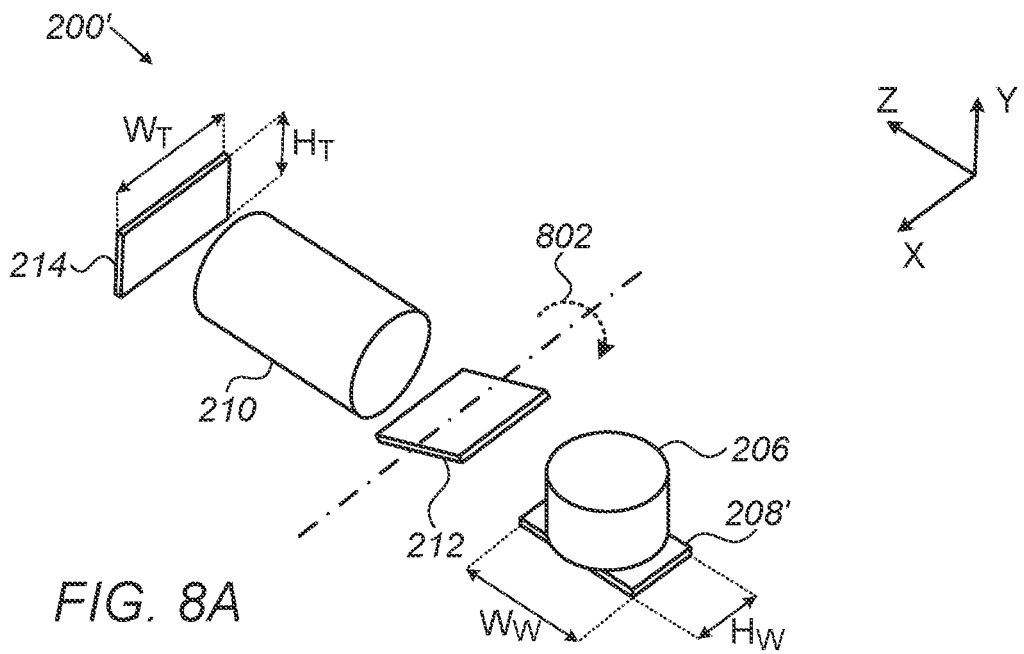
FIG. 8A shows schematically the dual-aperture camera of FIG. 6A with the prism rotated to a second position.

As mentioned, in FIGS. 2A, 3, 4A and 5A, both Wide sensor 208 and Tele sensor 214 are positioned with their longer side ("width") in the X direction. Their shorter side ("height") is in the Z direction for sensor 208 and in the Y direction for sensor 214. FIG. 6A shows schematically a dual-aperture camera 200' comprising an upright camera 206 with a Wide sensor 208' rotated by 90 degrees relative to sensor 208 in camera 206 of FIG. 2A. As also shown in FIGS. 7A and 8A, Wide sensor 208' now has its height in the X direction and its width in the Z direction. Note that $W_W$ is now also orthogonal to the $H_T$. This 90 degree in-plane rotation of the Wide sensor provides certain advantages in terms of the positioning and movement of $FOV_T$ relative to $FOV_W$, and consequently in terms of the capture, processing and display of Tele and Wide images. One major advantage is that a larger percentage of $FOV_W$ can have high resolution by setting a prism rotation angle. FIG. 6B shows schematically the position of $FOV_T$ 232' (now rotated by 90 degrees relative to $FOV_W$ 230) in a centered position caused by a zero position of prism 212, after the camera itself was rotated by 90 degrees (not shown) compared to the camera of FIG. 2B.

Figure 7B:
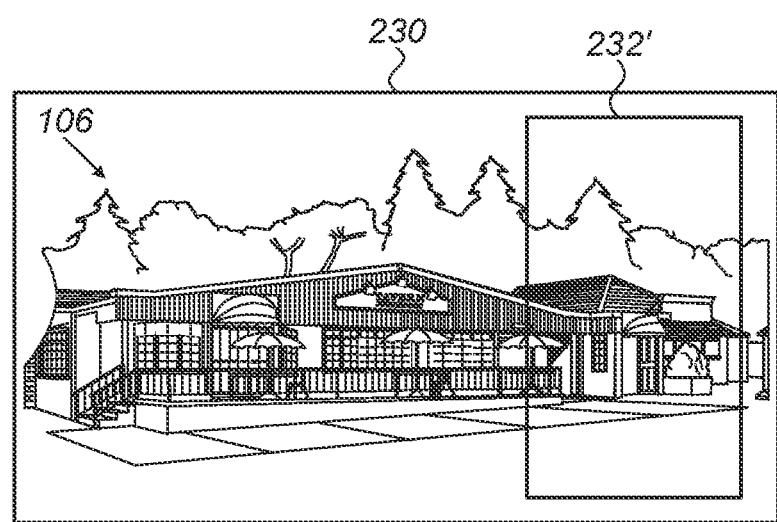
FIG. 7B shows a composite image obtained with a dual-aperture camera as in FIG. 7A, with the Tele FOV resulting from the first prism position.
Figure 8B:
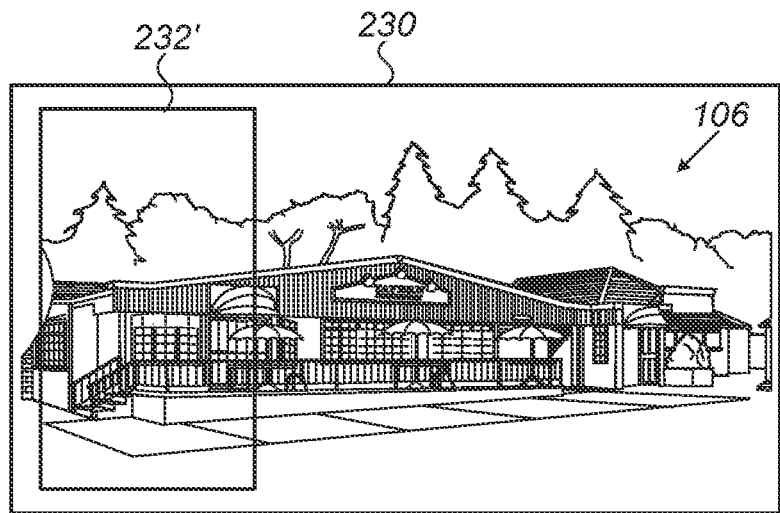
FIG. 8B shows a composite image obtained with a dual-aperture camera as in FIG. 8A, with the Tele FOV resulting from the second prism position.

FIG. 7A shows schematically the dual-aperture camera of FIG. 6A with prism 212 rotated counter-clockwise (as indicated by a curved arrow 702 when viewed in the −X direction) around the X-axis from its zero position to a new position. As shown in FIG. 7B, this prism rotation causes Tele FOV 232' to move to a "right" position relative to the Wide FOV. FIG. 8A shows prism 212 rotated clockwise (as indicated by a curved arrow 802 when viewed in the −X direction) around the X-axis from its zero position to a second position. As shown in FIG. 8B, this prism rotation causes Tele FOV 232' to move to a "left" position relative to the Wide FOV. While FIGS. 7A, 7B, 8A and 8B show two discrete prism rotation movements and two discrete Tele FOV positions relative to the Wide FOV, there is clearly an entire range of practically continuous positions that the Tele FOV may occupy, depending on the degree and direction of prism rotation.

Note that a similar $FOV_T$ relative positioning effect to that described above may be obtained by in-plane rotating Tele sensor 214 by 90 degrees and by leaving Wide sensor 208 unchanged from its original position in FIG. 2A. However, the positioning of sensor 214 with $W_T$ in the Y direction may disadvantageously increase a camera height (and therefore a host device thickness).

Figure 9A:
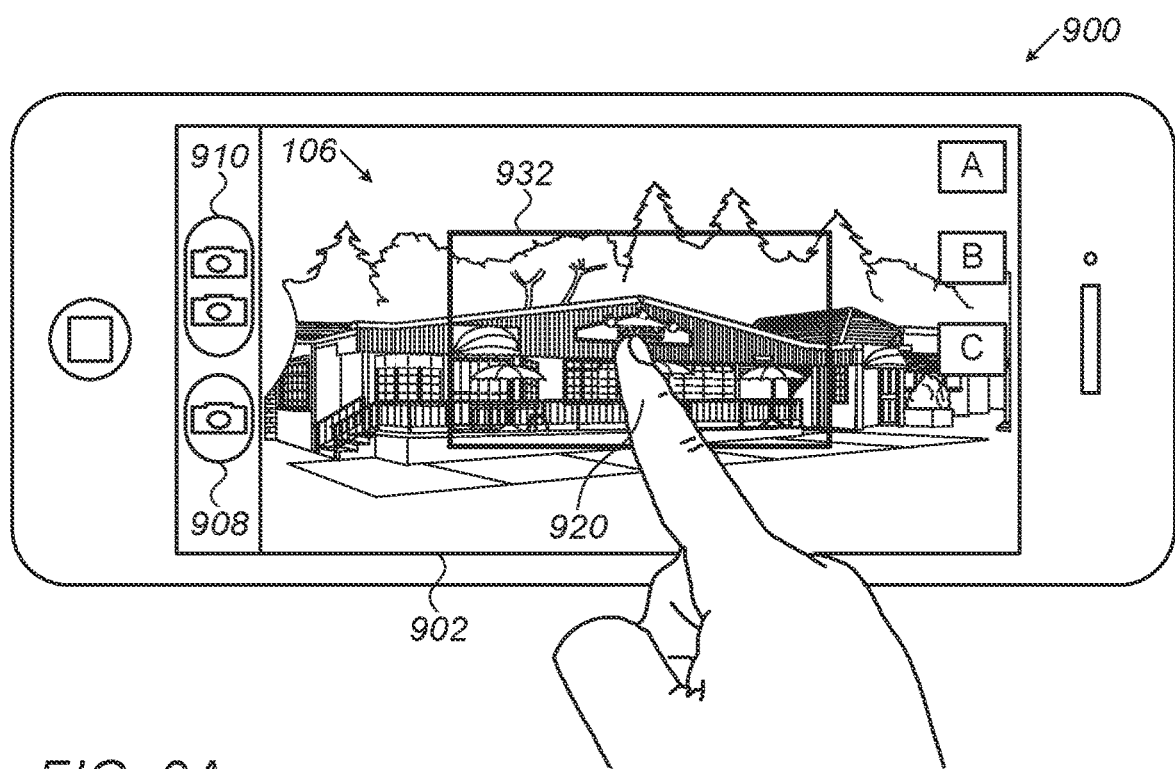
FIG. 9A shows a smartphone and user interface incorporating a dual-aperture camera with Tele FOV positioning capability disclosed herein in a zero, centered position on the smartphone screen.

When a dual-aperture camera described above is included for example in a smartphone, the Tele image (i.e. the part of scene 106 viewed and acquired by the Tele camera) is bound by a frame 932 visible on the smartphone screen. FIG. 9A shows an exemplary smartphone 900 that includes on a back side (not shown) a Wide camera and a Tele camera as in FIG. 2A or 6A. The Wide and Tele cameras have known fields of view with a known ratio $M=FOV_T/FOV_W$ between them. In general, M may have any value between ¼ and ¾. For example, M may have values of ½, 9/16 or ¾. Consequently, frame 932 includes almost exactly the image seen by $FOV_T$ and has a size that is a fraction M of the entire screen (which includes the image seen by $FOV_W$). Note that for camera configuration as the one shown in FIG. 6A and for Wide and Tele image sensors with 4:3 aspect ratio, selecting M=¾ will result in $FOV_T$ that will overlap the short dimension of $FOV_W$ in its entirety and will enable complete scanning of the Wide FOV by tilting the prism. The same argument is applicable for image sensors having 16:9 aspect ratio with M=9/16.

In still mode, scene 106 is acquired by both cameras, with the Wide camera providing the entire image seen (i.e. the Wide image) and the Tele camera providing the part of scene 106 bound by frame 932. Smartphone 900 further includes, on a front side opposite to the back side, a screen or display 902 displaying a view of scene 106. Screen 902 may display icons or text "A", "B", "C", etc., that provide indications and/or are selectable to perform various operations of the phone and/or the cameras. Such icons or text may be indicative of flash setting, video or stills selection, back or front camera selection, etc. The square boxes surrounding "A", "B" and "C" are merely illustrative and may have different shape or be removed altogether in some cases. Note that the fact that only three icons are shown is not meant to be limiting, and that more or fewer icons may be displayed and/or selectable at any time during or prior to image acquisition by the cameras and/or during display of acquired images. In an embodiment of the dual-aperture camera as in FIG. 2A, the "zero" position of the prism provides the composite image seen in FIG. 9A, where frame 932 is centered on the screen.

In various embodiments and as described in more detail in PCT/IB2016/056060, smartphone 900 may have a user interface that includes a single camera icon (or "button") 908 and a "two-camera" button 910. The two-camera button may appear on the screen when the FOV of the scene ($FOV_{scene}$) is greater or equal to $FOV_T$. As described in detail in PCT/IB2016/056060, the user interface displays visually the almost exact $FOV_T$ and enables simple acquisition of the image within $FOV_T$, thereby providing a Tele image with the highest resolution enabled by the Tele camera. The user interface also enables simultaneous acquisition (with a single input through the user interface, i.e. using two-camera button 910) of a Wide image and a Tele image. Image fusion of the Wide and Tele images or video streams can take place on the capturing device or in a cloud environment.

Figure 9B:
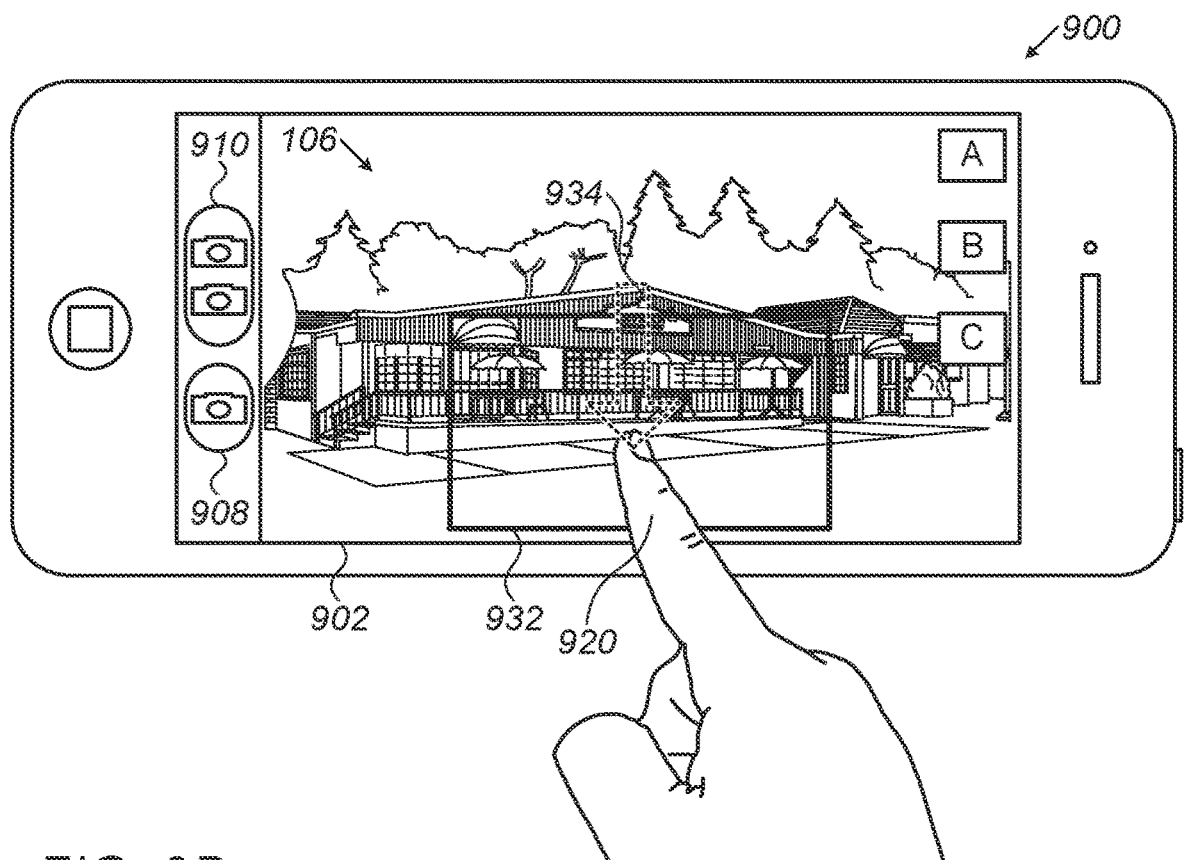
FIG. 9B shows the smartphone and user interface of FIG. 9A with the Tele FOV moved to a down position within the screen.
Figure 9C:
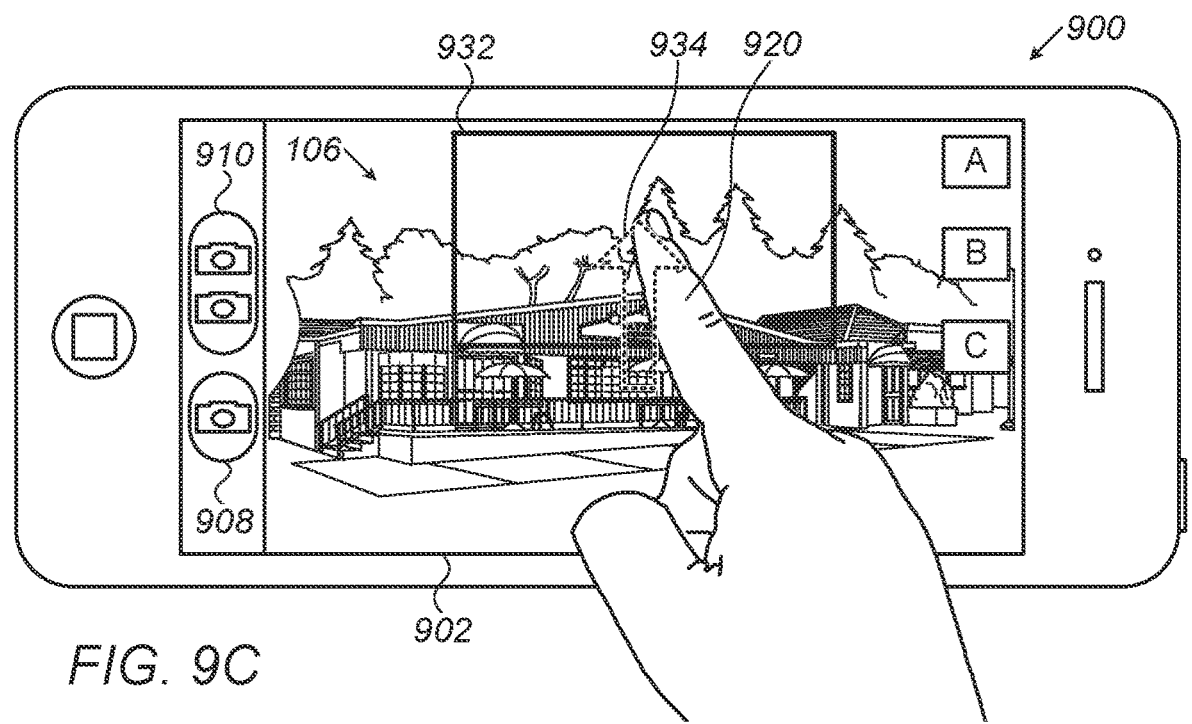
FIG. 9C shows the smartphone and user interface of FIG. 9A with the Tele FOV moved to an up position within the screen.
Figure 9D:
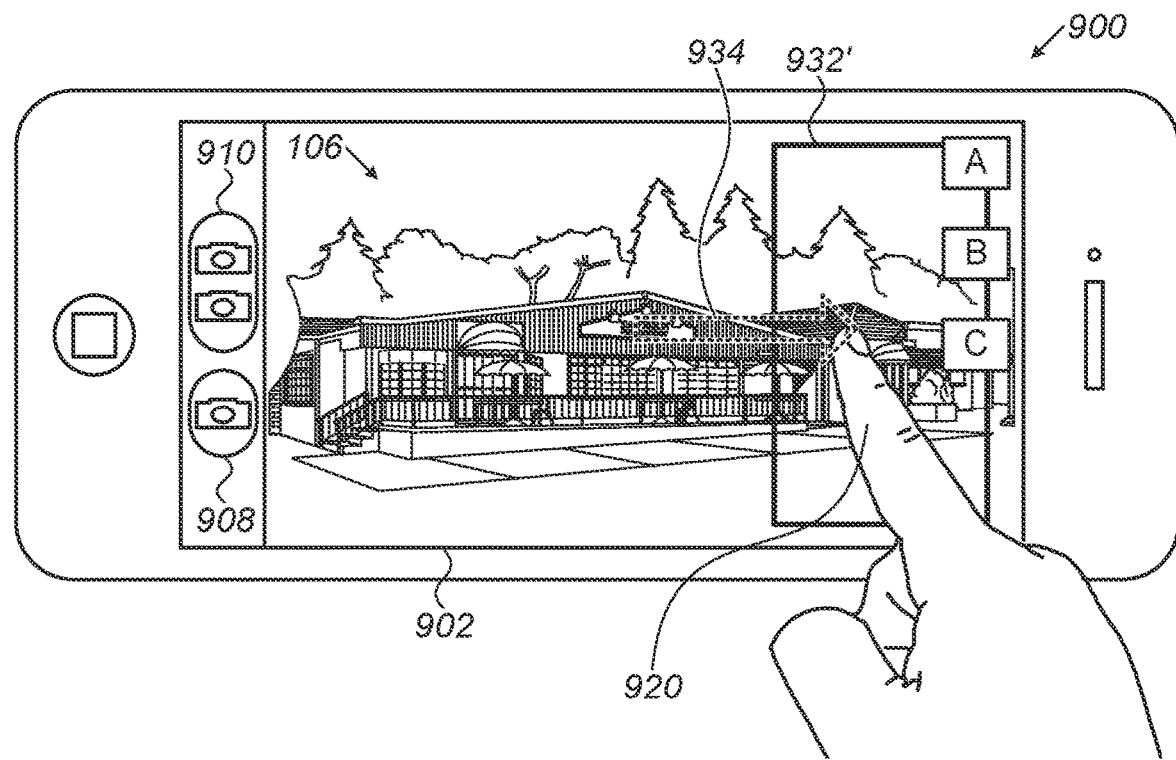
FIG. 9D shows the smartphone and user interface of FIG. 9A with the Tele FOV rotated by 90 degrees relative to the Wide FOV and moved to a right position within the screen.
Figure 9E:
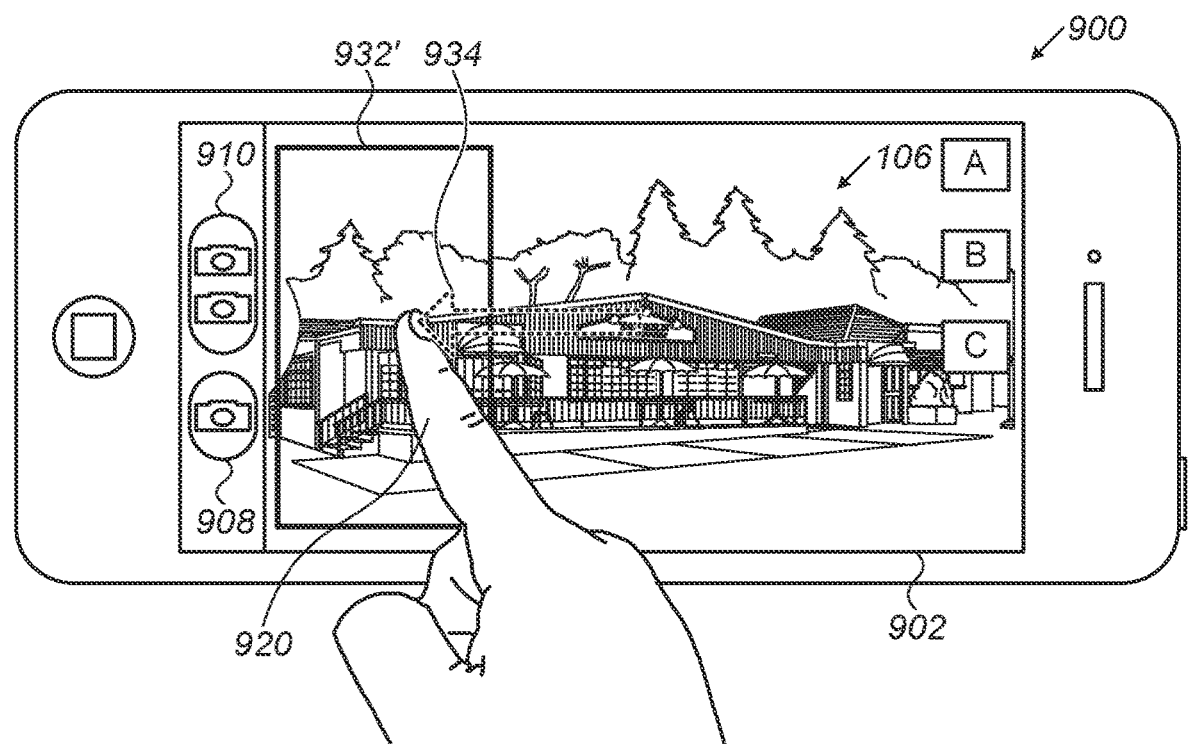
FIG. 9E shows the smartphone and user interface of FIG. 9A with the Tele FOV rotated by 90 degrees relative to the Wide FOV and moved to a left position within the screen.

The present inventors have determined that, advantageously, a user interface as described above can be used to "drag" frame 932 (and $FOV_T$) on screen 902 to bring different parts of the scene into $FOV_T$. That is, the dragging of frame 932 is translated into rotation of the "folded" path prism, such that the higher resolution Tele image "moves" to different parts of the scene. The dragging may be performed by a firm touch of the screen by a finger 920 and movement of the finger across the screen. In FIG. 9A, the finger touches the screen in the general area of "zero" positioned (centered) frame 932. The finger may drag the frame (and $FOV_T$) to a "down" position as in FIG. 9B, to an "up" position as in FIG. 9C, or to any intermediate position (not shown) between the down and up positions. The touch and drag actions are relayed to a camera controller (not shown), which, in turn, controls the prism movement. The dragging of frame 932 to the down position in FIG. 9B, indicated schematically by an arrow 934, is equivalent to rotation of the prism to its position in FIG. 4A. The dragging of frame 932 to the up position in FIG. 9C is equivalent to rotation of the prism to its position in FIG. 5A. Similarly, with a dual-aperture camera with a 90 degree rotated Wide sensor as in FIGS. 6A-8A, a frame 932' (now also rotated by 90 degrees relative to frame 932 in FIGS. 9A-9C) may be dragged from a zero position to a "right" position as in FIG. 9D or a "left" position as in FIG. 9E. The dragging of frame 932' to the right position in FIG. 9D is equivalent to rotation of the prism to its position in FIG. 7A. The dragging of frame 932' to the up position in FIG. 9E is equivalent to rotation of the prism to its position in FIG. 8A.

As described in detail in PCT/IB2016/056060, in terms of image acquisition, a user may press two-camera button 910 to simultaneously acquire two images, the Wide image of scene 106 at its respective (lower) image resolution and the Tele image of region (frame) 932 (or 932') at its respective (higher) image resolution. The two images may be stored in an on-board storage (such as "camera roll" in an iPhone) and may be displayed or downloaded for further use as known in the art. The user may press single camera button 908 to acquire only the Wide image, which can further be stored, displayed and downloaded for further use. The user may choose for display on screen 902 only the Tele image by, for example, double-tapping or pressing at any point on the screen within frame 932 (or 932'). This action leads to display of the Tele image on the entire screen. The Tele image (only) can then be chosen for acquisition by pressing on single camera button 908. The acquired Tele image can then be stored, displayed and downloaded for further use as above. The two images can also be fused (on the camera hosting device or in a cloud) into a composite image with a portion marked by a frame 932 or 932's formed by the higher-resolution Tele image, and with a peripheral portion formed by a peripheral portion of the relatively lower resolution Wide image.

Figure 10:
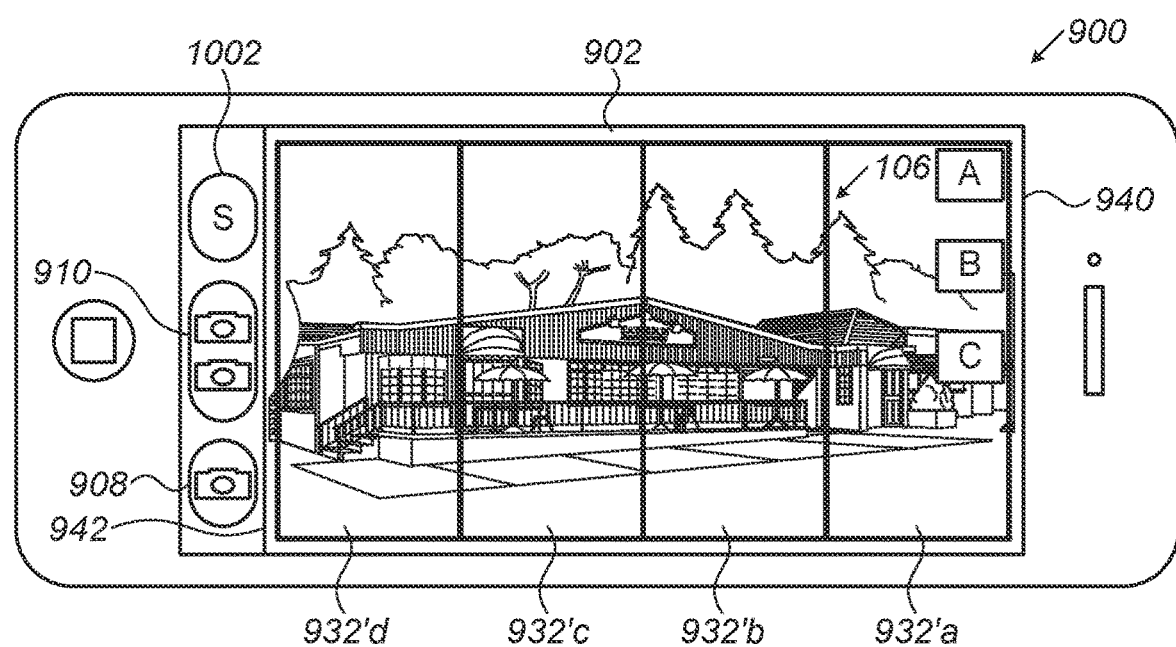
FIG. 10 shows a smartphone and user interface as in FIG. 9D or 9E used in a scanning mode of the Tele FOV.

Clearly, frame 932' (and the Tele FOV) may be dragged to any intermediate position (not shown) between the right and left positions. In other words, the Tele FOV may be moved laterally on the screen to a number of partially overlapping or non-overlapping (but touching) positions, from a right-most position (at a right screen edge 940) to a left-most position (at a left screen edge 942) or vice-versa, and an entire image of the scene may be "stitched" together from the partially overlapping or non-overlapping Tele images. For example, as shown in FIG. 10, the ratio M of the Tele and Wide FOVs may be such that screen 902 includes, and is substantially covered by, four adjacent frames 932'a-d. Note that the screen may include fewer adjacent frames than the number required to substantially fill in the entire screen. For example, in an embodiment, there may be only two or three adjacent frames (instead of the four shown). An optional "Scan" icon or button 1002 may then be used to scan (i.e. move the $FOV_T$ frame) automatically from a right-most position on the screen (i.e. from frame 932'$a$) to a left-most position (i.e. to frame 932'$d$) or vice-versa. Alternatively, a "Scan" command may be given by voice control. The scan function, similarly to the dragging action, provides partially overlapping or non-overlapping Tele images that can be stitched together into a high-resolution Tele image of the entire scene. A scan command, whether through icon 1002 or vocally, may also lead to acquisition of each Tele image defined by a frame 932' and to its storage for further processing. A Wide image can be captured during the scan function, allowing further processing that may include image fusion of the Wide image with the various Tele images (or the stitched Tele images) to form a high resolution image with a FOV that is larger than $FOV_T$.

Note that the direction of prism rotation and the consequent movement of $FOV_T$ relative to $FOV_W$ on a smartphone (or any other host device) screen depends on the geometry of the assembly of the dual-aperture camera in the host device. The description above relates to one particular such geometry. In a different geometry, the prism rotation directions and the resulting $FOV_T$ movement may be in opposite directions to those described above.

The devices, used interface and associated methods disclosed above may be used for automatic movement or "automatic adjustment" of the Tele FOV for e.g. tracking a subject in an autonomous manner. We refer to a camera mode that performs automatic Tele FOV movement to track an object or subject of interest as "autonomous Tele FOV tracking". The autonomous Tele FOV movement is in response to recognition (through e.g. the smartphone camera) of the object or subject of interest, and the Tele image focuses on and displays the object or subject of interest. The object recognition may be performed using any of the methods known in the art. An example of autonomous Tele FOV tracking is shown in FIGS. 11A-11C.

Figure 11A:
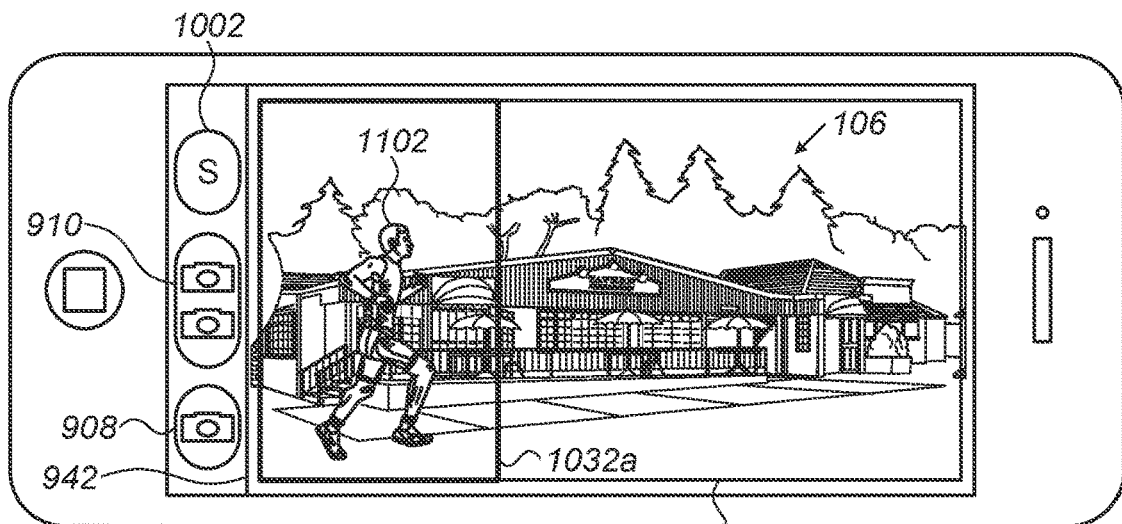
FIG. 11A shows a smartphone and user interface incorporating a dual-aperture camera with automatic Tele FOV tracking disclosed herein with a first Tele FOV position on the smartphone screen.

FIG. 11A shows a smartphone and user interface incorporating a dual-aperture camera with automatic Tele FOV tracking disclosed herein with a first Tele FOV position on the smartphone screen. FIG. 1B shows the smartphone and user interface of FIG. 1A with a second Tele FOV position on the smartphone screen. FIG. 11C shows the smartphone and user interface of FIG. 11A with a third Tele FOV position on the smartphone screen. In each of these figures, the object of interest is a runner 1102. The decision to track the runner is taken either by the user (e.g., by touching the runner's image) or automatically (e.g., using face detection). It is assumed that the Tele camera can change its FOV by tilting the prism to track the object of interest. Ideally, the camera will track the object such that it is as close as possible to the center of the adjustable Tele FOV as seen in 1032$a$, 1032$b$ and 1032$c$.

Figure 11B:
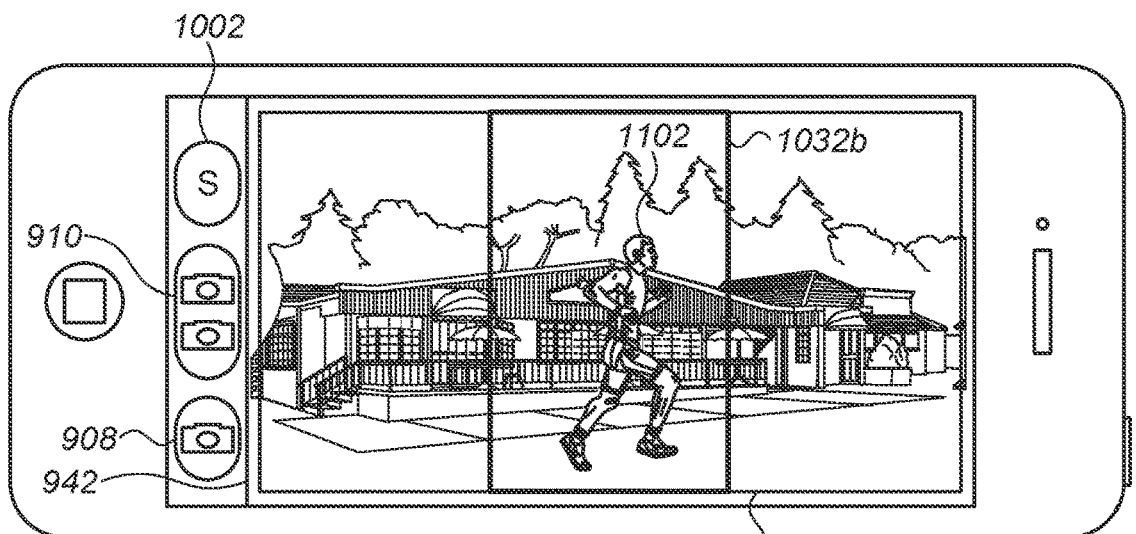
FIG. 11B shows the smartphone and user interface of FIG. 11A with a second Tele FOV position on the smartphone screen.
Figure 11C:
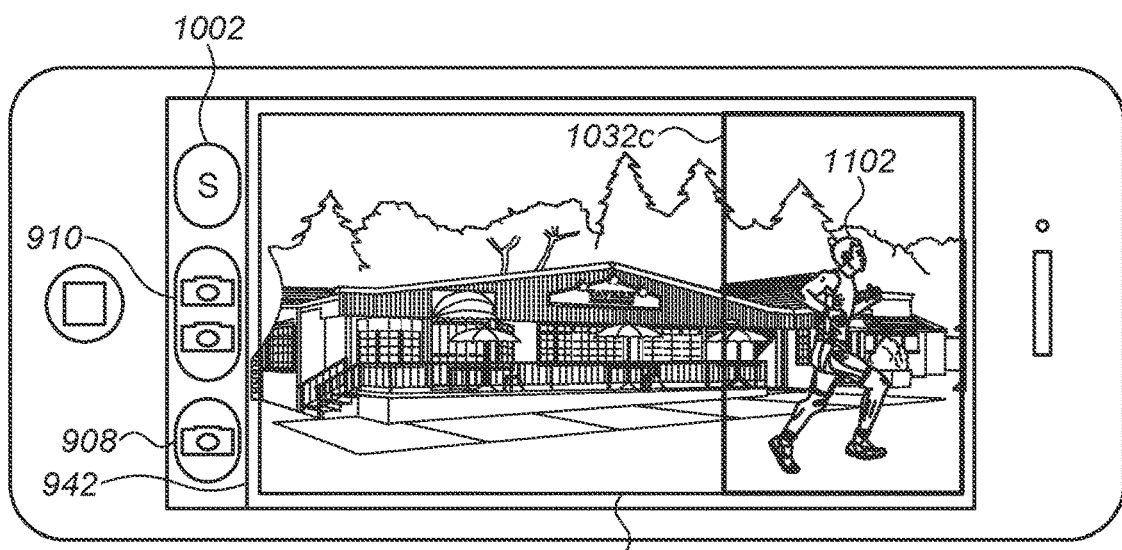
FIG. 11C shows the smartphone and user interface of FIG. 11A with a third Tele FOV position on the smartphone screen.

While the smartphone shown in FIGS. 11A-11C displays icons 908, 910 and 1002, one or more other icons (not shown) may replace and/or be used_in addition to or instead of icons 908, 910 and 1002 during operation in the Tele FOV tracking mode.

Wide and Tele images and/or video streams can be recorded during the automatic tracking mode and fused together to form a composite image or composite video stream. This fusion can be applied on the camera hosting device or alternatively. Wide and Tele images or video streams can be uploaded to the cloud for applying this fusion operation. Each composite image may also be formed with $FOV_W$ by scanning with the Tele camera, stitching a plurality of Tele images to provide a "stitched" Tele image, then fusing the stitched Tele image with the Wide image. This is advantageous in that the Wide image captures the entire scene simultaneously, while the Tele images to be stitched together are consecutive, so one can overcome motion or occlusions in the scene if required. The stitching of the Tele images and/or the fusion of the stitched Tele image with the Wide image may also be performed in a cloud.

While this disclosure has been described in terms of certain embodiments and generally associated methods, alterations and permutations of the embodiments and methods will be apparent to those skilled in the art. The disclosure is to be understood as not limited by the specific embodiments described herein, but only by the scope of the appended claims.

What is claimed is:

1. A digital camera comprising:
    a) a Wide camera that provides Wide images with a Wide resolution and a Wide field of view ($FOV_W$), wherein the Wide camera includes a Wide lens with a Wide lens optical axis and a Wide image sensor with a width $W_W$ and a height $H_W$, wherein $W_W > H_W$ and wherein the Wide camera is configured to detect an object; and
    b) a folded Tele camera that provides Tele images with a Tele field of view ($FOV_T$) smaller than the $FOV_W$, wherein the Tele camera includes a Tele image sensor with a width $W_T$ and a height $H_T$, wherein $W_T > H_T$, wherein $H_T$ is parallel to the Wide lens optical axis, and wherein the Tele camera is configured to receive data about the object from the Wide camera and to perform autonomous $FOV_T$ tracking of the object.

2. The digital camera of claim 1, wherein $W_W$ is also parallel to $W_T$.

3. The digital camera of claim 1, wherein $W_W$ is also orthogonal to $H_W$.

4. The digital camera of claim 1, wherein the digital camera is further configured to fuse a Wide image acquired during the autonomous $FOV_T$ tracking with at least one Tele image acquired during the autonomous $FOV_T$ tracking to form a composite image.

5. A digital camera comprising:
    a) a Wide camera that provides Wide images with a Wide resolution and a Wide field of view ($FOV_W$), wherein the Wide camera includes a Wide lens with a Wide lens optical axis and a Wide image sensor with a width $W_W$ and a height $H_W$, wherein $W_W > H_W$ and wherein the Wide camera is configured to detect an object; and
    b) a folded Tele camera that provides Tele images with a Tele field of view ($FOV_T$) smaller than the $FOV_W$, wherein the Tele camera includes a Tele image sensor with a width $W_T$ and a height $H_T$, wherein $W_T > H_T$, wherein $H_T$ is parallel to the Wide lens optical axis, and wherein the digital camera is configured to capture simultaneously a Wide image and a Tele image, with the $FOV_T$ positioned at a first position within the $FOV_W$.

6. The digital camera of claim 5, wherein $W_T$ is also parallel to $H_W$.

7. The digital camera of claim 5, wherein $W_W$ is also orthogonal to $H_W$.

8. The digital camera of claim 5, wherein the digital camera is incorporated in a host device having a user interface for operating the digital camera, and wherein user interface is used to capture simultaneously the Wide image and the Tele image.

9. The digital camera of claim 8, wherein the user interface comprises a screen for displaying at least one icon and an image of the object.

10. The digital camera of claim 9, wherein the screen is used to display a frame defining $FOV_T$ within $FOV_W$.

* * * * *